(12) United States Patent
Zhang et al.

(10) Patent No.: US 11,483,794 B2
(45) Date of Patent: Oct. 25, 2022

(54) RANGING SIGNAL TRANSMISSION IN UNLICENSED BAND

(71) Applicant: QUALCOMM Incorporated, San Diego, CA (US)

(72) Inventors: Xiaoxia Zhang, San Diego, CA (US); Srinivas Yerramalli, San Diego, CA (US); Taesang Yoo, San Diego, CA (US); Junyi Li, Chester, NJ (US); Yongbin Wei, La Jolla, CA (US); Sudhir Kumar Baghel, Hillsborough, NJ (US); Shailesh Patil, San Diego, CA (US); Kapil Gulati, Hillsborough, NJ (US); Chang-Sik Choi, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/989,745

(22) Filed: Aug. 10, 2020

(65) Prior Publication Data

US 2021/0058889 A1 Feb. 25, 2021

Related U.S. Application Data

(60) Provisional application No. 62/890,917, filed on Aug. 23, 2019.

(51) Int. Cl.
*H04W 64/00* (2009.01)
*H04W 4/029* (2018.01)
(Continued)

(52) U.S. Cl.
CPC ........ *H04W 64/003* (2013.01); *G01S 5/0268* (2013.01); *G01S 11/04* (2013.01);
(Continued)

(58) Field of Classification Search
CPC ..... H04W 4/029; H04W 4/40; H04W 64/003; H04W 74/0808; H04L 5/0048; G01S 5/0268; G01S 11/04
(Continued)

(56) References Cited

U.S. PATENT DOCUMENTS

| 2016/0073366 A1* | 3/2016 | Ng | ...................... H04W 56/001 370/329 |
| 2018/0007576 A1* | 1/2018 | Lee | ...................... H04W 24/10 |

(Continued)

FOREIGN PATENT DOCUMENTS

WO WO-2018111173 A1 6/2018

OTHER PUBLICATIONS

International Search Report and Written Opinion—PCT/US2020/045721—ISA/EPO—dated Oct. 20, 2020 (194322WO).

*Primary Examiner* — Congvan Tran
(74) *Attorney, Agent, or Firm* — Holland & Hart LLP/Qualcomm Incorporated

(57) ABSTRACT

This disclosure provides systems, methods and apparatuses for wireless communication that may allow a user equipment (UE) to determine its relative position and distances to other UEs more accurately than standard vehicle-to-everything (V2X) communications allow. In some implementations, a UE (or other wireless communication device) participating in a positioning operation may transmit and receive positioning signals on an unlicensed radio band, and may transmit and receive non-positioning signals on a V2X channel (or on another suitable channel) of a radio access network (RAN). The positioning signals may include positioning reference signals (PRSs) associated with observed time difference of arrival (OTDOA) positioning operations, ranging signals associated with round-trip time (RTT) posi- (Continued)

tioning operations, or other suitable signals from which the position of the UE can be determined.

26 Claims, 16 Drawing Sheets

(51) Int. Cl.
  *H04W 4/40* (2018.01)
  *H04W 74/08* (2009.01)
  *G01S 11/04* (2006.01)
  *G01S 5/02* (2010.01)
  *H04L 5/00* (2006.01)
(52) U.S. Cl.
  CPC ........... *H04L 5/0048* (2013.01); *H04W 4/029* (2018.02); *H04W 4/40* (2018.02); *H04W 74/0808* (2013.01)
(58) Field of Classification Search
  USPC ...................................................... 455/456.1
  See application file for complete search history.

(56) References Cited

U.S. PATENT DOCUMENTS

| | | |
|---|---|---|
| 2018/0054750 A1 | 2/2018 | Lee et al. |
| 2018/0054792 A1* | 2/2018 | Lee ........................ H04W 64/00 |
| 2018/0310237 A1* | 10/2018 | Kumar .................... H04W 4/02 |
| 2018/0343056 A1 | 11/2018 | Radulescu et al. |
| 2019/0208366 A1 | 7/2019 | Sosnin et al. |
| 2019/0353746 A1* | 11/2019 | Razavi .................... H04L 5/005 |
| 2019/0363843 A1* | 11/2019 | Gordaychik .......... H04L 1/1854 |
| 2020/0037354 A1* | 1/2020 | Li ..................... H04W 74/0808 |
| 2020/0217918 A1* | 7/2020 | Rydén .................. H04W 4/029 |
| 2021/0050925 A1* | 2/2021 | Modarres Razavi ........................ H04W 12/0431 |
| 2021/0112521 A1* | 4/2021 | Dwivedi ............... H04L 5/0051 |
| 2021/0160810 A1* | 5/2021 | Zhang ........................ G01S 5/10 |

* cited by examiner

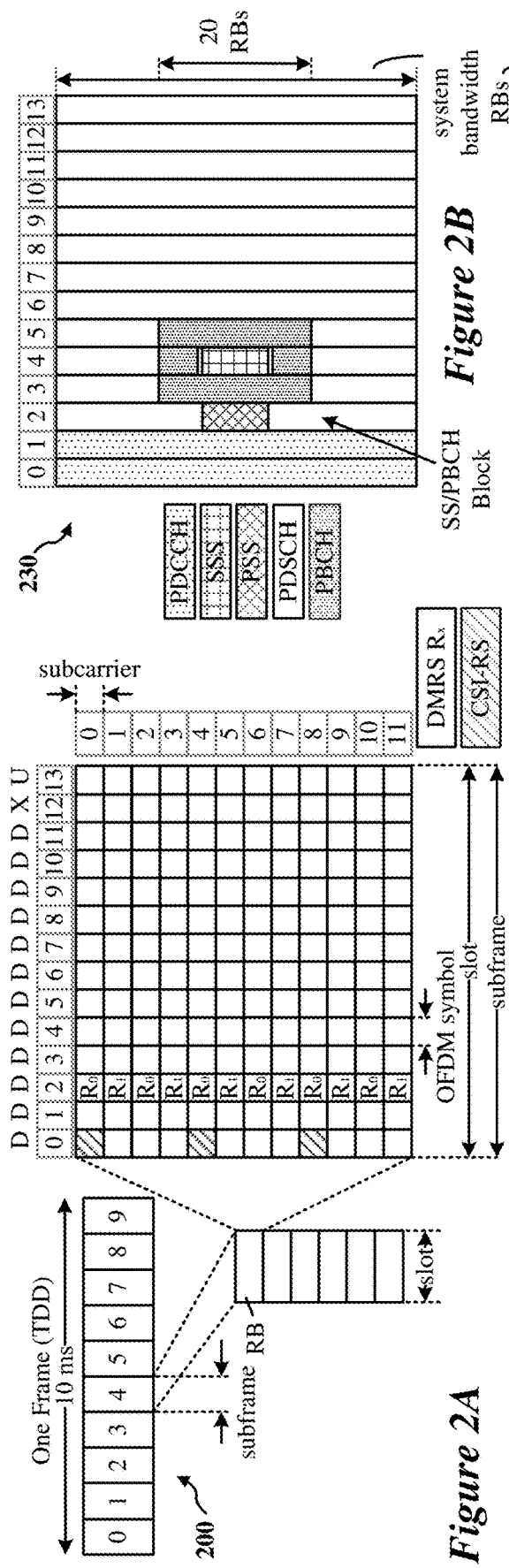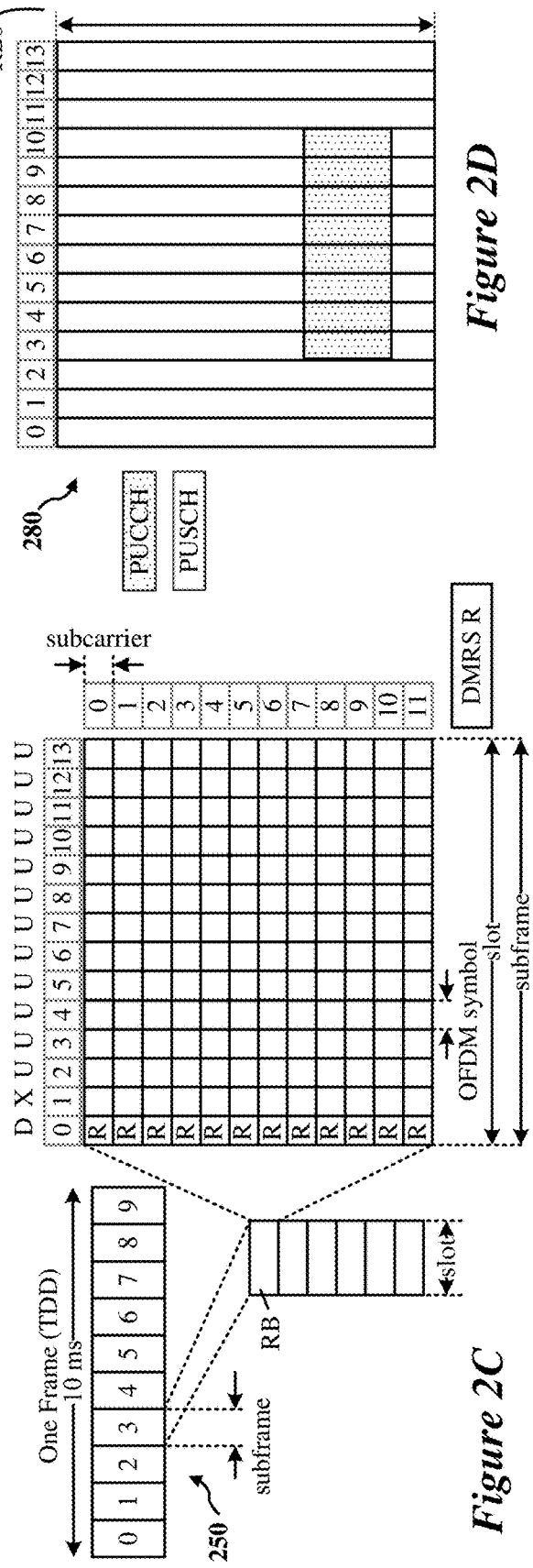
Figure 2A
Figure 2B
Figure 2C
Figure 2D

RANGING SIGNAL TRANSMISSION IN UNLICENSED BAND

CROSS-REFERENCE TO RELATED APPLICATIONS

This patent application claims priority to U.S. Provisional Patent Application No. 62/890,917 entitled "RANGING SIGNAL TRANSMISSION IN UNLICENSED BAND" and filed on Aug. 23, 2019, which is assigned to the assignee hereof. The disclosures of all prior applications are considered part of and are incorporated by reference in this patent application.

TECHNICAL FIELD

This disclosure relates generally to wireless communications and, more specifically, to positioning operations in a wireless communications system.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). A wireless multiple-access communications system may include a number of base stations or access network nodes, each simultaneously supporting communication for multiple communication devices, which may be otherwise known as user equipment (UE).

Wireless communication systems may include or support networks used for vehicle-based communications, also referred to as vehicle-to-everything (V2X), vehicle-to-vehicle (V2V) networks, and cellular V2X (C-V2X) networks. Vehicle-based communication networks may provide always-on telematics for which UEs (such as vehicle UEs (v-UEs)) can communicate directly to the network (V2N), to pedestrian UEs (V2P), to infrastructure devices (V2I), and to other v-UEs.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication. The method may be performed by an apparatus of a user equipment (UE), and may include receiving location assistance data including a list of candidate transmission-reception points (TRPs) for a positioning operation, and receiving a positioning reference signal (PRS) from each candidate TRP of a number of the candidate TRPs over an unlicensed Fifth Generation (5G) New Radio (NR) radio band. In some implementations, the method also may include determining reference signal time difference (RSTD) measurements based at least in part on the PRSs received over the unlicensed 5G NR radio band, and transmitting the determined RSTD measurements to a location server.

In some implementations, the location assistance data may include a PRS configuration indicating one or more of a transmission time of the PRS from each candidate TRP or the unlicensed 5G NR radio band upon which each of the PRSs is received. In some instances, the PRS configuration may indicate a bandwidth, a subframe offset, a periodicity, a duration, a muting pattern, and a muting sequence periodicity of the corresponding TRP. The location assistance data also may include one or more of identification information for the candidate TRPs, timing information for the candidate TRPs, PRS configurations of the candidate TRPs, and location information of the candidate TRPs. In some instances, the identification information for a respective candidate TRP may be one or more of a physical cell ID (PID), a global cell ID (GCI), or a UE ID.

In some implementations, the method also may include receiving a location measurement request over a channel of a 5G NR access network prior to receiving the location assistance data. In some instances, the channel may be a vehicle-to everything (V2X) frequency subband of the 5G NR access network, the unlicensed 5G NR radio band, or a licensed 5G NR radio band. In some other instances, the channel may be or include one or more Unlicensed National Information Infrastructure (UNIT) radio bands such as the UNIT-1 radio band, the UNII-2A radio band, the UNIT-2B radio band, or the UNII-3 radio band.

In some other implementations, the method also may include transmitting one or more PRSs to at least one candidate TRP of the number of candidate TRPs over the unlicensed 5G NR radio band, and performing a round-trip time (RTT) ranging operation with the at least one candidate TRP based at least in part on the received PRS and the one or more transmitted PRSs.

Another innovative aspect of the subject matter described in this disclosure can be implemented in a wireless communication device. The wireless communication device may include a memory, at least one network interface, and a processing system communicatively coupled to the memory and the at least one network interface. In some implementations, the processing system may be configured to receive location assistance data including a list of candidate transmission-reception points TRPs for a positioning operation, and to receive a PRS from each candidate TRP of a number of the candidate TRPs over an unlicensed 5G NR radio band. The processing system also may be configured to determine RSTD measurements based at least in part on the PRSs received over the unlicensed 5G NR radio band, and to transmit the determined RSTD measurements to a location server.

In some implementations, the location assistance data may include a PRS configuration indicating one or more of a transmission time of the PRS from each candidate TRP or the unlicensed 5G NR radio band upon which each of the PRSs is received. In some instances, the PRS configuration may indicate a bandwidth, a subframe offset, a periodicity, a duration, a muting pattern, and a muting sequence periodicity of the corresponding TRP. The location assistance data also may include one or more of identification information for the candidate TRPs, timing information for the candidate TRPs, PRS configurations of the candidate TRPs, and location information of the candidate TRPs. In some instances, the identification information for a respective candidate TRP may be one or more of a PID, a GCI, or a UE ID.

In some implementations, the processing system also may be configured to receive a location measurement request over a channel of a 5G NR access network prior to receiving the location assistance data. In some instances, the channel may be a V2X frequency subband of the 5G NR access network, the unlicensed 5G NR radio band, or a licensed 5G NR radio band. In some other instances, the channel may be or include one or more UNIT radio bands such as the UNII-1 radio band, the UNII-2A radio band, the UNII-2B radio band, or the UNII-3 radio band.

In some other implementations, the processing system also may be configured to transmit one or more PRSs to at least one candidate TRP of the number of candidate TRPs over the unlicensed 5G NR radio band, and to perform an RTT ranging operation with the at least one candidate TRP based at least in part on the received PRS and the one or more transmitted PRSs.

Another innovative aspect of the subject matter described in this disclosure can be implemented as a method for wireless communication. In some implementations, the method may be performed by an apparatus of a UE, and may include receiving a PRS configuration, and transmitting a sequence of PRSs based on the received PRS configuration over an unlicensed 5G NR radio band. In some instances, the PRS configuration may be received over a channel including one of a V2X frequency subband of a 5G NR access network, a licensed radio band of the 5G NR access network, or an unlicensed 5G NR radio band. The received PRS configuration may identify the unlicensed 5G NR radio band upon which the UE is to transmit the sequence of PRSs.

In some implementations, the UE may transmit the sequence of PRSs over the unlicensed 5G NR radio band using Short Control Signaling Transmissions without medium sensing. In some instances, the received PRS configuration may allocate a first CET window for PRS transmissions from the UE within each of number of time periods, and may allocate one or more other CET windows for PRS transmissions from one or more wireless nodes within each of the number of time periods. The time period may correspond to an observation period defined for Short Control Signaling Transmissions on unlicensed radio bands, and each of the CET windows may correspond to a total duration of the Short Control Signaling Transmissions allowed on unlicensed radio bands from a given LBE during the observation period.

In some implementations, transmitting the sequence of PRSs may include contending for channel access over the unlicensed 5G NR radio band using a category-2 LBT channel access mechanism, gaining access to the unlicensed 5G NR radio band for a duration based on the contending, and transmitting the sequence of PRSs over the unlicensed 5G NR radio band during at least part of the duration. In some instances, the received PRS configuration may allocate a first PRS window to the UE for PRS transmissions within a time period, and may allocate one or more other PRS windows to one or more wireless nodes for PRS transmissions within the time period. The time period may correspond to an observation period defined for Short Control Signaling Transmissions on unlicensed radio bands, and each of the PRS windows may correspond to a total duration of the Short Control Signaling Transmissions allowed on unlicensed radio bands from a given LBE during the observation period.

In some other implementations, transmitting the sequence of PRSs may include contending for channel access on the unlicensed 5G NR radio band using a category-4 LBT channel access mechanism for a highest-priority traffic class, gaining access to the unlicensed 5G NR radio band for a channel occupancy time (COT) based on the contending, and transmitting the sequence of PRSs over the unlicensed 5G NR radio band during at least part of the COT. In some instances, the received PRS configuration may allocate a first PRS window to the UE for PRS transmissions within a time period, and may allocate one or more other PRS windows to one or more wireless nodes for PRS transmissions within the time period. The time period may be independent of an observation period defined for Short Control Signaling Transmissions on unlicensed radio bands, and each of the CET windows may be independent of a total duration of Short Control Signaling Transmissions allowed on unlicensed radio bands from a given LBE during the observation period.

Another innovative aspect of the subject matter described in this disclosure can be implemented in a wireless communication device. The wireless communication device may include a memory, at least one network interface, and a processing system communicatively coupled to the memory and the at least one network interface. In some implementations, the processing system may be configured to receive a PRS configuration, and to transmit a sequence of PRSs based on the received PRS configuration over an unlicensed 5G NR radio band. In some instances, the PRS configuration may be received over a channel including one of a V2X frequency subband of a 5G NR access network, a licensed radio band of the 5G NR access network, or an unlicensed 5G NR radio band. The received PRS configuration may identify the unlicensed 5G NR radio band upon which the wireless communication device is to transmit the sequence of PRSs.

In some implementations, the wireless communication device may transmit the sequence of PRSs over the unlicensed 5G NR radio band using Short Control Signaling Transmissions without medium sensing. In some instances, the received PRS configuration may allocate a first CET window for PRS transmissions from the wireless communication device within each of the number of time periods, and may allocate one or more other CET windows for PRS transmissions from one or more wireless nodes within each of the number of time periods. The time period may correspond to an observation period defined for Short Control Signaling Transmissions on unlicensed radio bands, and each of the CET windows may correspond to a total duration of the Short Control Signaling Transmissions allowed on unlicensed radio bands from a given LBE during the observation period.

In some implementations, the processing system may be configured to transmit the sequence of PRSs by contending for channel access over the unlicensed 5G NR radio band using a category-2 LBT channel access mechanism, gaining access to the unlicensed 5G NR radio band for a duration based on the contending, and transmitting the sequence of PRSs over the unlicensed 5G NR radio band during at least part of the duration. In some instances, the received PRS configuration may allocate a first PRS window to the wireless communication device for PRS transmissions within a time period, and may allocate one or more other PRS windows to one or more wireless nodes for PRS transmissions within the time period. The time period may correspond to an observation period defined for Short Control Signaling Transmissions on unlicensed radio bands, and each of the PRS windows may correspond to a total duration of the Short Control Signaling Transmissions allowed on unlicensed radio bands from a given LBE during the observation period.

In some other implementations, the processing system may be configured to transmit the sequence of PRSs by contending for channel access on the unlicensed 5G NR radio band using a category-4 LBT channel access mechanism for a highest-priority traffic class, gaining access to the unlicensed 5G NR radio band for a COT based on the contending, and transmitting the sequence of PRSs over the unlicensed 5G NR radio band during at least part of the COT. In some instances, the received PRS configuration may allocate a first PRS window to the wireless communication device for PRS transmissions within a time period, and may allocate one or more other PRS windows to one or more wireless nodes for PRS transmissions within the time period. The time period may be independent of an observation period defined for Short Control Signaling Transmissions on unlicensed radio bands, and each of the CET windows may be independent of a total duration of Short Control Signaling Transmissions allowed on unlicensed radio bands from a given LBE during the observation period.

Another innovative aspect of the subject matter described in this disclosure can be implemented as a method for wireless communication. In some implementations, the method may be performed by an apparatus of a UE, and may include receiving, on a channel of a radio access network (RAN), location assistance data including a list of candidate transmission-reception points (TRPs) for a positioning operation; receiving a positioning reference signal (PRS) from each of a number of the candidate TRPs on an unlicensed frequency band; and determining positioning information of the UE based at least in part on the received PRSs. The channel may be a vehicle-to everything (V2X) frequency subband of a fifth-generation (5G) new radio (NR) access network. The unlicensed frequency band may be one or more Unlicensed National Information Infrastructure (UNIT) radio bands (such as one or more of the UNII-1 radio band, the UNII-2A radio band, the UNII-2B radio band, or the UNII-3 radio band). In some implementations, determining the positioning information can include determining reference signal time difference (RSTD) measurements based at least in part on the received PRSs. The method also can include determining a position of the UE based at least in part on the determined RSTD measurements, transmitting the determined RSTD measurements to a location server, or both.

The location assistance data also may include one or more of identification information for the candidate TRPs, timing information for the candidate TRPs, PRS configurations of the candidate TRPs, and location information of the candidate TRPs. In some implementations, the location assistance data also may include a transmission time of the PRS from each of the number of candidate TRPs, and may identify the unlicensed frequency band upon which each of the PRSs is transmitted. The identification information for a respective candidate TRP may include one or more of a physical cell ID (PID), a global cell ID (GCI), or a UEID. The PRS configuration may include a bandwidth, a subframe offset, a periodicity, a duration, a muting pattern, and a muting sequence periodicity of the corresponding TRP. In some implementations, the PRS configuration also may identify the unlicensed frequency band upon which a respective TRP transmits the PRS.

Another innovative aspect of the subject matter described in this disclosure can be implemented as a method for wireless communication. In some implementations, the method may be performed by an apparatus of a UE, and may include receiving a PRS configuration on a channel of a RAN, and transmitting a sequence of PRSs based on the received PRS configuration on an unlicensed frequency band. The channel may be a V2X frequency subband of a 5G NR access network, and the unlicensed frequency band may be one or more UNIT radio bands.

In some implementations, the sequence of PRSs may be transmitted on the unlicensed frequency band using Short Control Signaling Transmissions without medium sensing. The received PRS configuration may allocate a first CET window for PRS transmissions from the UE within each of number of time periods, and may allocate one or more other CET windows for PRS transmissions from one or more wireless nodes within each of the number of time periods. The received PRS configuration also may include the CET window allocations. In some implementations, the time period may correspond to an observation period defined for Short Control Signaling Transmissions on the unlicensed frequency band, and each of the CET windows may correspond to a total duration of the Short Control Signaling Transmissions allowed on the unlicensed frequency band from a given LBE during the observation period.

In other implementations, transmitting the sequence of PRSs may include contending for medium access on the unlicensed frequency band using a category-2 LBT protocol, gaining access to the unlicensed frequency band for a duration based on the contending, and transmitting the sequence of PRSs on the unlicensed frequency band during at least part of the duration. The received PRS configuration may allocate a first PRS window to the UE for PRS transmissions within a time period, and may allocate one or more other PRS windows to one or more wireless nodes for PRS transmissions within the time period. In some implementations, the time period may correspond to an observation period defined for Short Control Signaling Transmissions on the unlicensed frequency band, and each of the PRS windows may correspond to a total duration of the Short Control Signaling Transmissions allowed on the unlicensed frequency band from a given LBE during the observation period.

In some other implementations, transmitting the sequence of PRSs may include contending for medium access on the unlicensed frequency band using a category-4 LBT medium access protocol for a highest-priority traffic class, gaining access to the unlicensed frequency band for a COT based on the contending, and transmitting the sequence of PRSs on the unlicensed frequency band during at least part of the duration. The received PRS configuration may allocate a first PRS window to the UE for PRS transmissions within a time period, and may allocate one or more other PRS windows to one or more wireless nodes for PRS transmissions within the time period. In some implementations, the time period may be independent of an observation period defined for Short Control Signaling Transmissions on the unlicensed frequency band, and each of the CET windows may be independent of a total duration of Short Control Signaling Transmissions allowed on the unlicensed frequency band from a given LBE during the observation period.

Another innovative aspect of the subject matter described in this disclosure can be implemented as a method for wireless communication. In some implementations, the method may be performed by an apparatus of a UE, and may include determining a schedule for transmitting PRSs, transmitting the determined schedule to one or more wireless nodes on a channel of a RAN, and transmitting a sequence of PRSs on an unlicensed frequency band based on the determined schedule. In some implementations, the channel may be a V2X frequency subband of a 5G NR access network. In some instances, transmitting the sequence of PRSs includes contending for channel access on the unlicensed radio band using a category-4 LBT channel access mechanism. In some other implementations, the channel may be a physical downlink control channel (PDCCH), a physical downlink shared channel (PDSCH), a physical sidelink control channel (PSCCH), or a physical sidelink shared channel (PSSCH) of the RAN. The unlicensed frequency band may be one or more UNIT radio bands. In some instances, the determined schedule may include identification information of the one or more wireless nodes.

Another innovative aspect of the subject matter described in this disclosure can be implemented as a method for wireless communication. In some implementations, the method may be performed by an apparatus of a UE, and may include receiving a request to transmit a sequence of PRSs on a channel of a radio access network RAN, and transmitting the sequence of PRSs on an unlicensed frequency band based on the request. The channel may be a V2X frequency subband of a 5G NR access network, and the unlicensed frequency band may be one or more UNIT radio bands. In some implementations, transmitting the sequence of PRSs may include contending for medium access on the unlicensed frequency band using a LBT medium access protocol. In some instances, the sequence of PRSs may be transmitted using Short Control Signaling Transmissions. In some other instances, the sequence of PRSs can be transmitted during a CET window allocated to the UE. The CET window corresponds to a total duration of the Short Control Signaling Transmissions allowed on the unlicensed radio band from a given LBE during an observation period.

Another innovative aspect of the subject matter described in this disclosure can be implemented as a method for wireless communication. In some implementations, the method may be performed by an apparatus of a UE, and may include transmitting, on a channel of a RAN, a request for a number of other UEs to transmit a sequence of PRSs; and receiving, from at least one of the number of other UEs, the requested sequence of PRSs on an unlicensed radio band. The channel may be a V2X frequency subband of a 5G NR access network, and the unlicensed frequency band may be one or more UNIT radio bands. In some implementations, the request may be a unicast message identifying each of the number of other UEs for transmitting the sequences of PRSs. In some other implementations, the request may be a multicast message identifying a group of other UEs for transmitting the sequences of PRSs. In some other implementations, the request may identify a group of other UEs that are located within a specified zone. In addition, or in the alternative, the requested PRS may be a sidelink PRS.

In some instances, the request is a unicast message identifying each of the number of other UEs for transmitting the sequences of PRSs. In other instances, the request is a multicast message identifying a group of other UEs for transmitting the sequences of PRSs. In some other instances, the request identifies a group of other UEs that are located within a specified zone. In some instances, the request identifies a group of other UEs that are located within a specified zone. In some other instances, the requested PRS is a sidelink PRS.

Another innovative aspect of the subject matter described in this disclosure can be implemented as a method for wireless communication. In some implementations, the method may be performed by an apparatus of a UE, and may include contending for channel access on an unlicensed frequency band using a category-4 LBT channel access mechanism; obtaining access to the unlicensed radio band for a COT based on the contending; transmitting, over a channel of a RAN, a message including a request for a number of other UEs to transmit a sequence of PRSs; and receiving, from at least one of the number of other UEs, the requested sequence of PRSs on the unlicensed radio band during a portion of the COT. In some implementations, the category-4 LBT channel access mechanism may be an eCCA mechanism without exponential back-off. In some instances, the message allocates a unique portion of the COT to each of the number of other UEs for transmitting the sequence of PRSs. The channel may be a V2X frequency subband of a 5G NR access network, and the unlicensed frequency band may be one or more UNIT radio bands. In some instances, the one or more UNIT radio bands may include one or more of the UNII-1 radio band, the UNII-2A radio band, the UNII-2B radio band, or the UNII-3 radio band.

Another innovative aspect of the subject matter described in this disclosure can be implemented as a method for wireless communication. In some implementations, the method may be performed by an apparatus of a UE, and may include contending for channel access on an unlicensed radio band using a category-4 LBT channel access mechanism; obtaining access to the unlicensed radio band for a COT; transmitting, to a number of other UEs, a sequence of PRSs on the unlicensed radio band during the COT; determining whether any of the number of other UEs received the sequence of PRSs; and selectively adjusting a contention window size for a next channel access contention operation based on the determining. In some instances, the determining may include receiving, from at least one of the number of other UEs, a feedback message indicating a signal strength of the PRSs; and selectively adjusting the contention window size based on the indicated signal strength.

The channel may be a V2X frequency subband of a 5G NR access network, and the unlicensed frequency band may be one or more UNIT radio bands. The method also can include increasing the contention window size based on the indicated signal strength being less than a value, and maintaining the contention window size based on the indicated signal strength being greater than the value. In some implementations, the category-4 LBT medium access protocol may be an eCCA procedure without exponential back-off.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A shows an example of a first 5G NR frame.

FIG. 2B shows example downlink (DL) channels within a 5G NR slot.

FIG. 2C shows an example of a second 5G NR frame.

FIG. 2D shows example uplink (UL) channels within a 5G NR slot.

Like reference numbers and designations in the various drawings indicate like elements.

DETAILED DESCRIPTION

Figure 1:
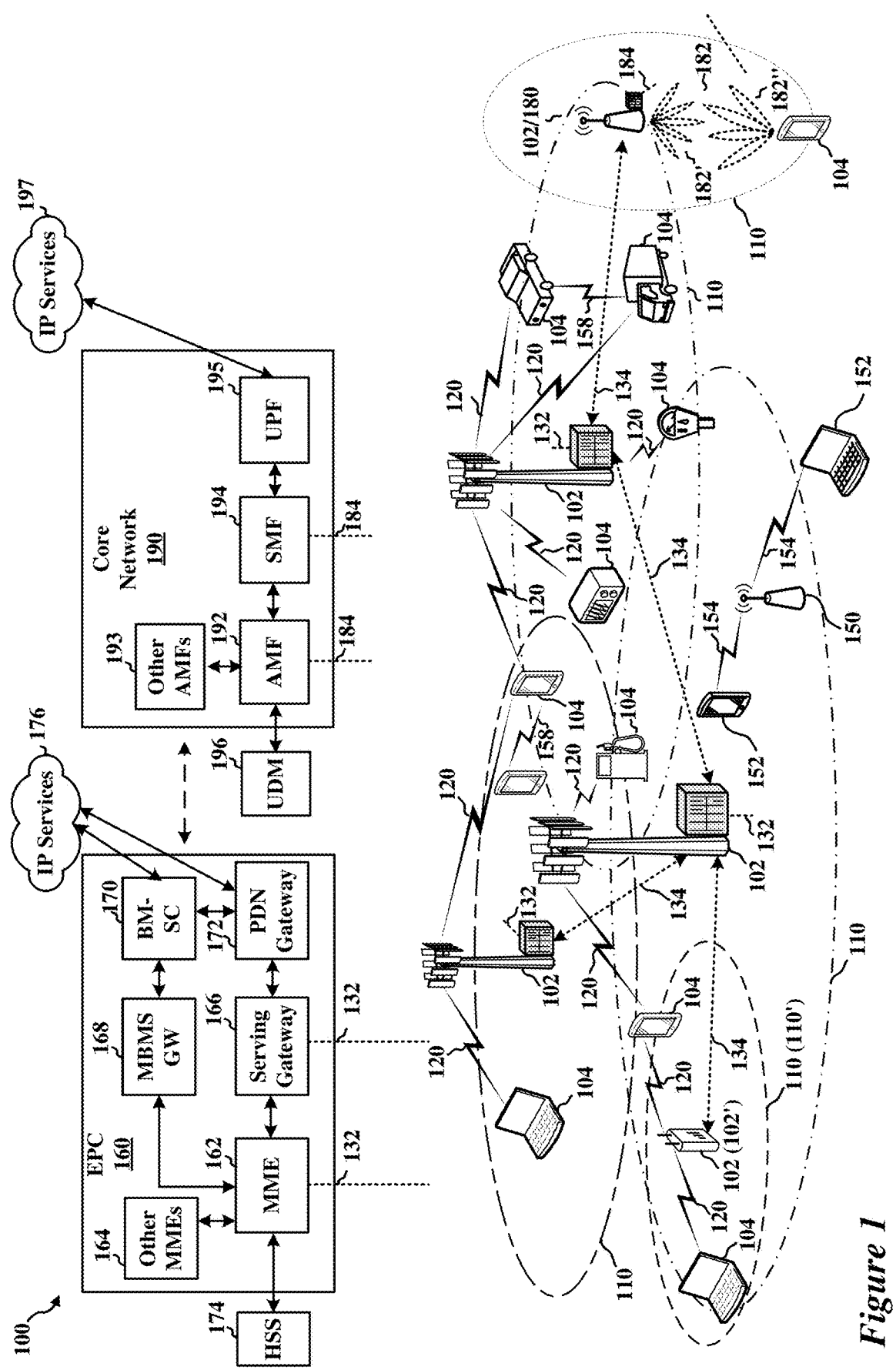
FIG. 1 shows a diagram illustrating an example wireless communications system.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Vehicle based communications (V2X), vehicle-to-vehicle (V2V) networks, and cellular V2X (C-V2X) networks may provide persistent connectivity so that vehicle UEs (v-UEs) can communicate directly to the network (V2N), to pedestrian UEs (V2P), to infrastructure devices (V2I), and to other v-UEs. These vehicle based communication networks may support a safe, always-connected driving experience by providing intelligent connectivity through which traffic signal timing information, real-time traffic and routing information, safety alerts to pedestrians, collision avoidance information, and other messages are exchanged between vehicles via UEs. The ability of a vehicle UE to accurately determine not only its absolute position but also its position relative to other vehicles or obstacles and the distances between the vehicle UE and nearby vehicles or obstacles (such as a fast-approaching car) is of particular interest.

Implementations of the subject matter described in this disclosure may be used by a UE (such as a vehicle UE) to determine its position and to determine distances to other UEs with greater accuracy than conventional V2X communications. In accordance with various aspects of the present disclosure, a UE participating in a positioning operation may transmit or receive non-positioning signals over a V2X channel, a licensed radio band, or other suitable channel of a radio access network (RAN), and may transmit or receive positioning signals over an unlicensed radio band. The positioning signals may include positioning reference signals (PRSs) associated with observed time difference of arrival (OTDOA) positioning operations, ranging signals associated with round-trip time (RTT) positioning operations, or other suitable signals from which the position of the UE can be determined. In some implementations, the positioning signals may be transmitted over one or more Unlicensed National Information Infrastructure (UNIT) radio bands including, for example, one or more of the UNII-1 radio band, the UNII-2A radio band, the UNII-2B radio band, or the UNII-3 radio band. In some other implementations, the positioning signals may be transmitted together with one or more of a physical downlink control channel (PDCCH), a physical downlink shared channel (PDSCH), a physical sidelink control channel (PSCCH), or a physical sidelink shared channel (PSSCH) of the RAN. In some instances, the RAN may be a 5G NR access network, the V2X channel may be or may occupy a frequency subband of the 5G NR access network, and the unlicensed radio band may be an unlicensed 5G NR radio band.

The non-positioning signals may include location requests, location information, location assistance data, PRS configurations, requests to transmit PRS sequences, requests to initiate ranging operations, and other suitable management messages, control messages, or configurations (such as radio resource control (RRC) configurations). In some instances, the non-positioning signals may be transmitted over the V2X channel of a 5G NR access network. In some other instances, one or more of the non-positioning signals may be transmitted over one or more unlicensed radio bands (such as an unlicensed 5G NR radio band).

In some implementations, a UE may transmit a sequence of PRSs over one or more unlicensed radio bands using Short Control Signaling Transmissions (SCST) without medium sensing. In some instances, a PRS configuration received by the UE may allocate a first Clear Channel Assessment (CCA) Exempt Transmission (CET) window for PRS transmissions from the UE within each of a number of time periods, and may allocate one or more other CET windows for PRS transmissions from one or more wireless nodes within each of the number of time periods. The time periods may correspond to an observation period defined for SCST on unlicensed radio bands, and each of the CET windows may correspond to a total duration of the SCST allowed on unlicensed radio bands from a given load-based equipment (LBE) during the observation period. In some instances, the observation period may be between approximately 25 and 100 milliseconds (ms), and the total duration may be no more than approximately 2.5 milliseconds. In some other instances, the observation period and the total duration may be specified by one or more standards or releases published by the European Telecommunications Standards Institute (ETSI).

In some implementations, the UE may contend for channel access on the unlicensed radio band using a category-2 listen-before-talk or listen-before-transmit (LBT) channel access mechanism, may gain access to the unlicensed radio band for a duration based on the contending, and may transmit a sequence of PRSs over the unlicensed radio band during at least part of the duration. In some instances, the PRS configuration received by the UE may allocate a first PRS window to the UE for PRS transmissions within a time period, and may allocate one or more other PRS windows to one or more wireless nodes for PRS transmissions within the time period.

In some other implementations, the UE may contend for channel access on the unlicensed radio band using a category-4 LBT channel access mechanism for a highest-priority traffic class, may gain access to the unlicensed radio band for a channel occupancy time (COT) based on the contending, and may transmit the sequence of PRSs over the unlicensed radio band during at least part of the COT. In some instances, the PRS configuration received by the UE may allocate a first PRS window to the UE for PRS transmissions within a time period, and may allocate one or more other PRS windows to one or more wireless nodes for PRS transmissions within the time period. The time period may be independent of an observation period defined for SCST on unlicensed radio bands, and each of the CET windows may be independent of a total duration of SCST allowed on unlicensed radio bands from a given load-based equipment (LBE) during the observation period.

In some other implementations, the UE may receive a request to transmit a sequence of PRSs on a channel of a RAN (such as a 5G NR access network), and may transmit the sequence of PRSs over one or more unlicensed radio bands (such as an unlicensed 5G NR radio band) based on the request. In some instances, the UE may contend for channel access on the unlicensed radio band using a LBT channel access mechanism, and may transmit the sequence of PRSs over the unlicensed radio band upon gaining channel access to the unlicensed radio band. In addition, or in the alternative, the UE may transmit, on a channel of the RAN, a request for a number of other UEs to transmit a sequence of PRSs, and may receive, from at least one of the number of other UEs, the requested sequence of PRSs on an unlicensed radio band (such as an unlicensed 5G NR radio band).

Particular implementations of the subject matter described in this disclosure can be implemented to realize one or more of the following potential advantages. The accuracy of positioning operations between wireless communication devices, whether based on observed time difference of arrival (OTDOA) techniques or round-trip time (RTT) techniques, may be proportional to the frequency bandwidth over which positioning signals are exchanged between the wireless communication devices. For example, OTDOA positioning operations for which the positioning reference signals (PRSs) are transmitted over a relatively large frequency bandwidth may be more accurate than OTDOA positioning operations for which the PRSs are transmitted over a relatively small frequency bandwidth. Similarly, ranging operations for which the ranging frames or signals are transmitted over a relatively large frequency bandwidth may be more accurate than ranging operations for which the ranging frames or signals are transmitted over a relatively small frequency bandwidth.

Accordingly, by allowing UEs to transmit or receive positioning signals or ranging signals over an unlicensed radio band that has a channel width greater than the channel width of the V2X frequency subband, aspects of the present disclosure may increase the accuracy with which OTDOA-based positioning operations can determine the positions of the UEs (such as compared to conventional techniques for which PRS sequences are transmitted over the V2X frequency subband). For example, while the V2X frequency subband has a channel width of 40 MHz, the UNII-1 and UNII-2A radio bands each have a channel width of 100 MHz, the UNII-2C radio band has a channel width of 255 MHz, and the UNII-3 radio band has a channel width of 125 MHz. As such, the accuracy of OTDOA-based positioning operations can be increased by transmitting the positioning signals over one (or more) of the UNIT radio bands (rather than over the V2X frequency subband). Similarly, by allowing UEs to exchange ranging signals over an unlicensed radio band having a channel width exceeding 100 MHz (rather than over a 40 MHz V2X frequency subband), aspects of the present disclosure may increase the accuracy with which RTT-based positioning operations can determine the positions of the UEs (such as compared with conventional techniques for which the ranging signals are exchanged on the V2X frequency subband).

FIG. 1 shows a diagram of an example wireless communications system 100. The wireless communications system 100 includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (such as the S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over backhaul links 134 (such as the X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5 MHz, 10 MHz, 15 MHz, 20 MHz, 100 MHz, 400 MHz, etc.) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as a macro base station), may include an eNB, gNodeB (gNB), or another type of base station. Some base stations, such as gNB 180, may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (such as between 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180 and UE 104 may perform beam training to determine the best receive and transmit directions for each of the base station 180 and UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting MBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The wireless communications system 100 may utilize both licensed and unlicensed radio frequency spectrum bands. For example, the wireless system 100 may employ LTE License Assisted Access (LTE-LAA), LTE Unlicensed (LTE U) radio access technology, or 5G NR technology in an unlicensed radio band (such as the 5 GHz Industrial, Scientific, and Medical (ISM) band or the 6 GHz UNIT bands). When operating in unlicensed radio bands, wireless communication devices (such as the base stations 102 and UEs 104) may employ listen-before-talk (LBT) channel access mechanisms to ensure the channel is clear before transmitting data. In some instances, operations in unlicensed radio bands may be based on a carrier aggregation (CA) configuration in conjunction with component carriers (CCs) operating in a licensed band. Operations in unlicensed radio bands may include downlink transmissions, uplink transmissions, or both. Duplexing in unlicensed radio bands may be based on frequency division duplexing (FDD), time division duplexing (TDD) or a combination of both.

The wireless communications system 100 also may include or support vehicle-based communications. Vehicle-based communication networks may provide always on telematics where UEs 104, referred to herein as v-UEs, communicate directly to V2N, to pedestrian UEs (V2P), to infrastructure devices (V2I), and to other v-UEs (such as via the network). The vehicle-based communication networks may support a safe, always-connected driving experience by providing intelligent connectivity where traffic signal/timing, real-time traffic and routing, safety alerts to pedestrians/bicyclist, collision avoidance information, and the like are exchanged.

FIG. 2A shows an example of a first slot 200 within a 5G/NR frame structure. FIG. 2B shows an example of DL channels 230 within a 5G/NR slot. FIG. 2C shows an example of a second slot 250 within a 5G/NR frame structure. FIG. 2D shows an example of UL channels 280 within a 5G/NR slot. In some cases, the 5G/NR frame structure may be FDD in which, for a particular set of subcarriers (carrier system bandwidth), slots within the set of subcarriers are dedicated for either DL or UL transmissions. In other cases, the 5G/NR frame structure may be TDD in which, for a particular set of subcarriers (carrier system bandwidth), slots within the set of subcarriers are dedicated for both DL and UL transmissions. In the examples shown in FIGS. 2A and 2C, the 5G/NR frame structure is based on TDD, with slot 4 configured with slot format 28 (with mostly DL), where D indicates DL, U indicates UL, and X indicates that the slot is flexible for use between DL and UL, and with slot 3 configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs may be configured with the slot format, either dynamically through downlink control information (DCI) or semi-statically through radio resource control (RRC) signaling by a slot format indicator (SFI). The configured slot format also may apply to a 5G/NR frame structure that is based on FDD.

Other wireless communication technologies may have a different frame structure or different channels. A frame may be divided into a number of equally sized subframes. For example, a frame having a duration of 10 microseconds (μs) may be divided into 10 equally sized subframes each having a duration of 1 μs. Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (such as for high throughput scenarios) or discrete Fourier transform (DFT) spread OFDM (DFT-s-OFDM) symbols (also referred to as single carrier frequency-division multiple access (SC-FDMA) symbols) (such as for power limited scenarios).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols per slot and 2μ slots per subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz, and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 microseconds (μs).

A resource grid may be used to represent the frame structure. Each time slot includes a resource block (RB) (also referred to as a physical RB (PRB)) that extends across 12 consecutive subcarriers and across a number of symbols. The intersections of subcarriers and across 14 symbols. The intersections of subcarriers and of the RB define multiple resource elements (REs). The number of bits carried by each RE depends on the modulation scheme.

As illustrated in FIG. 2A, some of the REs carry a reference signal (RS) for the UE. In some configurations, one or more REs may carry a demodulation reference signal (DM-RS) (indicated as Rx for one particular configuration, where 100× is the port number, but other DM-RS configurations are possible). In some configurations, one or more REs may carry a channel state information reference signal (CSI-RS) for channel measurement at the UE. The REs also may include a beam measurement reference signal (BRS), a beam refinement reference signal (BRRS), and a phase tracking reference signal (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
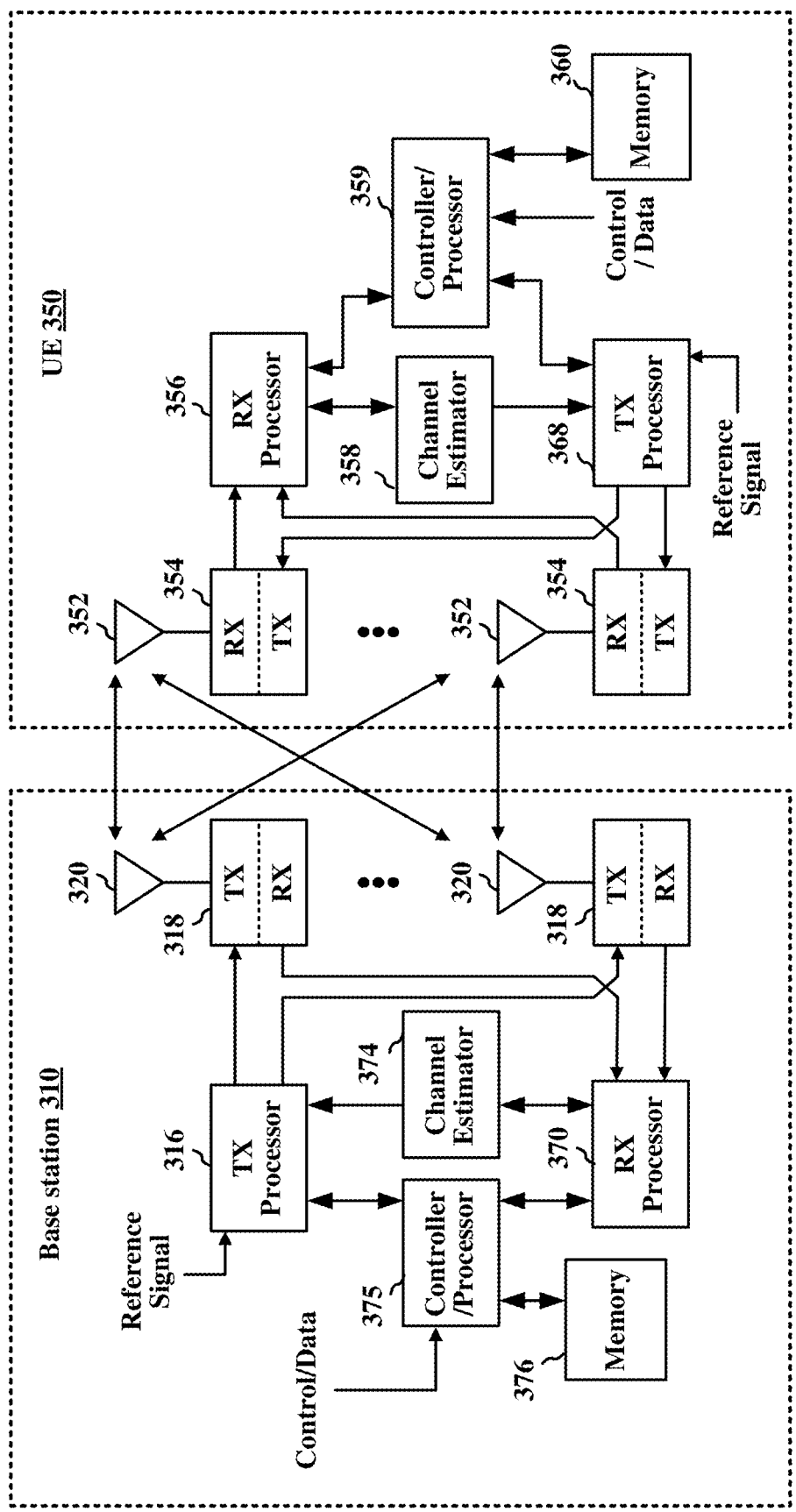
FIG. 3 shows a diagram illustrating an example base station and user equipment (UE).

FIG. 3 shows a block diagram of an example base station 310 and UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as the MIB and SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot signal) in the time or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as the MIB and SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations. Information to be wirelessly communicated (such as for LTE or NR based communications) is encoded and mapped, at the PHY layer, to one or more wireless channels for transmission.

In the example of FIG. 3, each antenna 352 of the UE 350 is coupled to a respective transmitter 354TX. However, in actual implementations, many UEs have fewer transmitters (or transmit chains) than receive (RX) antennas. Although not shown for simplicity, each transmitter may be coupled to a respective power amplifier (PA) which amplifies the signal to be transmitted. The combination of a transmitter with a PA may be referred to herein as a "transmit chain" or "TX chain." To save on cost or die area, the same PA may be reused to transmit signals over multiple RX antennas. In other words, one or more TX chains of a UE may be switchably coupled to multiple RX antennas ports.

Figure 4:
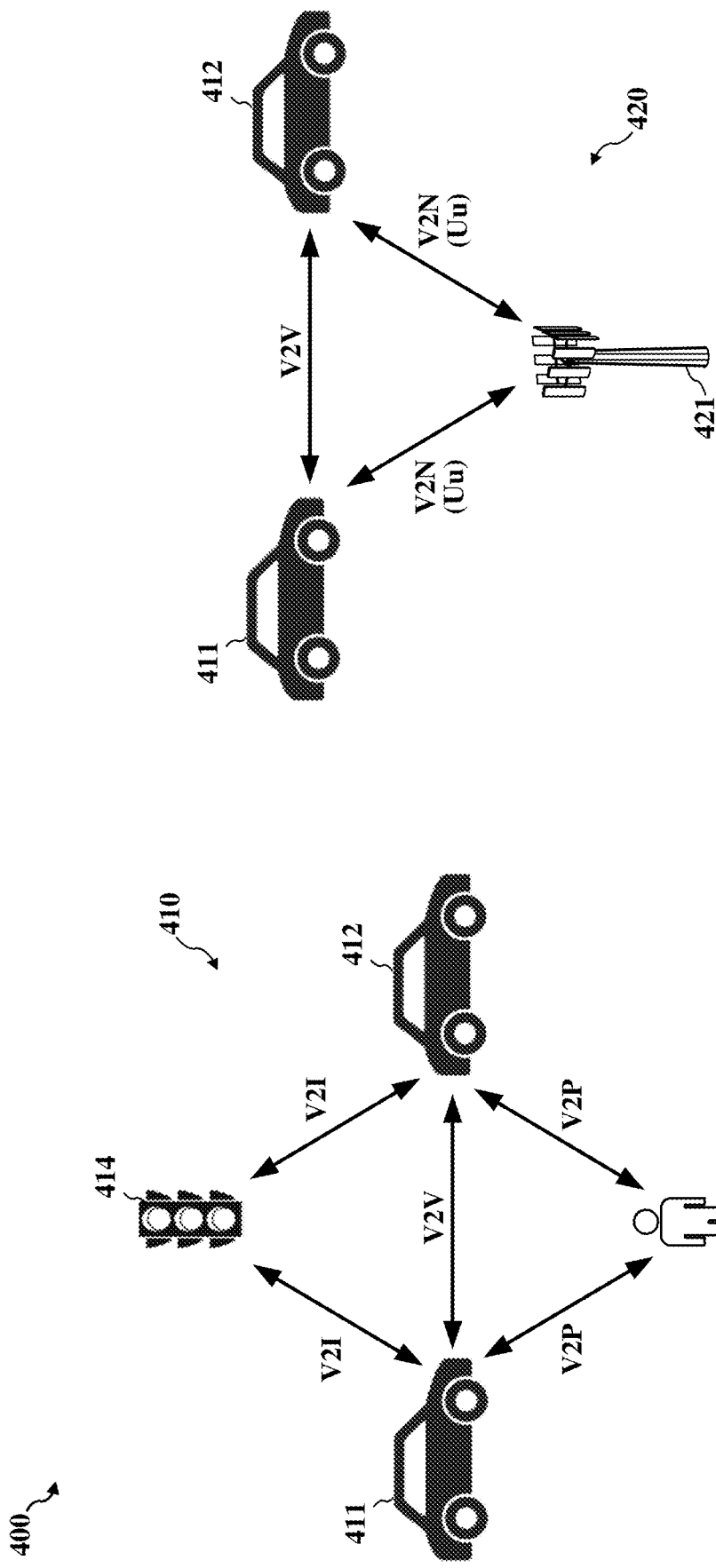
FIG. 4 shows an example vehicle-to-everything (V2X) communications system.

FIG. 4 shows an example vehicle-to-everything (V2X) communications system 400. The V2X communications system 400, within which at least some of the various aspects of the present disclosure may be implemented, may be configured to operate in the 5.9 GHz spectrum. In some implementations, the V2X communications system 400 may include two configurations 410 and 420. In the first configuration 410, UEs embedded within or associated with vehicles 411-412, person 413, and traffic signal 414 may communicate directly with each other using peer-to-peer (P2P) communications (such as without the base station 102 of FIG. 1). More specifically, each of the vehicles 411-412 may establish vehicle-to-person (V2P) communications with person 413 through a PC5 interface, and may establish vehicle-to-vehicle (V2V) communications with each other through a PC5 interface. Each of the vehicles 411-412 also may establish vehicle-to-infrastructure (V2I) communications with the traffic signal 414 through a PC5 interface. In some implementations, the first configuration 410 may be a self-managed system that does not require subscription to a radio access network (RAN). As such, the first configuration 410 may have lower costs and increased reliability, for example, as compared with the second configuration 420.

In the second configuration 420, UEs embedded within or associated with vehicles 411-412 and other devices or persons (not shown for simplicity) communicate with each other using vehicle-to-network (V2N) communications, for example, facilitated by a radio access network (RAN) associated with a number of base stations 421 (only one base station 421 shown for simplicity). More specifically, the base stations 421, which may be any suitable base station such as a gNB or an eNB, manage communications between the vehicles 411-412 and other devices or persons within a service area of the base stations 421.

The V2X communications system 400 may have several advantages over conventional IEEE 802.11p networks. For example, while conventional IEEE 802.11p networks have limited scaling capabilities and may suffer from channel access delays, V2X communications may be performed on a V2X frequency subband of a 5G NR access network without contending for channel access. Moreover, just as 5G NR is designed to meet new requirements associated with latency, reliability, security, and scalability, communications on the V2X frequency subband are also designed to meet new requirements associated with latency, reliability, security, and scalability, for example, as may be necessary to facilitate reliable communications between moving vehicles.

Timing information, real-time traffic information, collision avoidance information, and some other features provided by V2X communications and V2X channels of a RAN may depend, at least in part, on the ability of a UE (such as a v-UE) to accurately determine its position relative to other vehicles or obstacles and to accurately determine distances between the UE and nearby vehicles or obstacles. Since the accuracy of positioning operations (such as OTDOA or RTT-based ranging) may be proportional to the frequency bandwidth used to transmit and receive positioning signals, positioning and ranging accuracy may be increased by using wider channels to transmit and receive the positioning signals. As such, although a 40 MHz V2X channel of a 5G NR access network may allow for contention-free transmissions of positioning signals to, from, or between UEs, positioning and ranging accuracy may be improved by transmitting the positioning signals on wider channels.

In accordance with some aspects of the present disclosure, positioning signals (such as PRSs and ranging signals) may be transmitted over one or more unlicensed radio bands having wider channels than the V2X frequency subband, which may increase the accuracy with which positioning and ranging operations can be performed. In some implementations, positioning signals may be transmitted over one or more of the Unlicensed National Information Infrastructure (UNIT) radio bands, which have channel widths ranging from 100 MHz to as high as 255 MHz, thereby improving positioning and ranging accuracy (such as compared with transmitting positioning signals over a 40 MHz V2X frequency subband).

Figure 5:
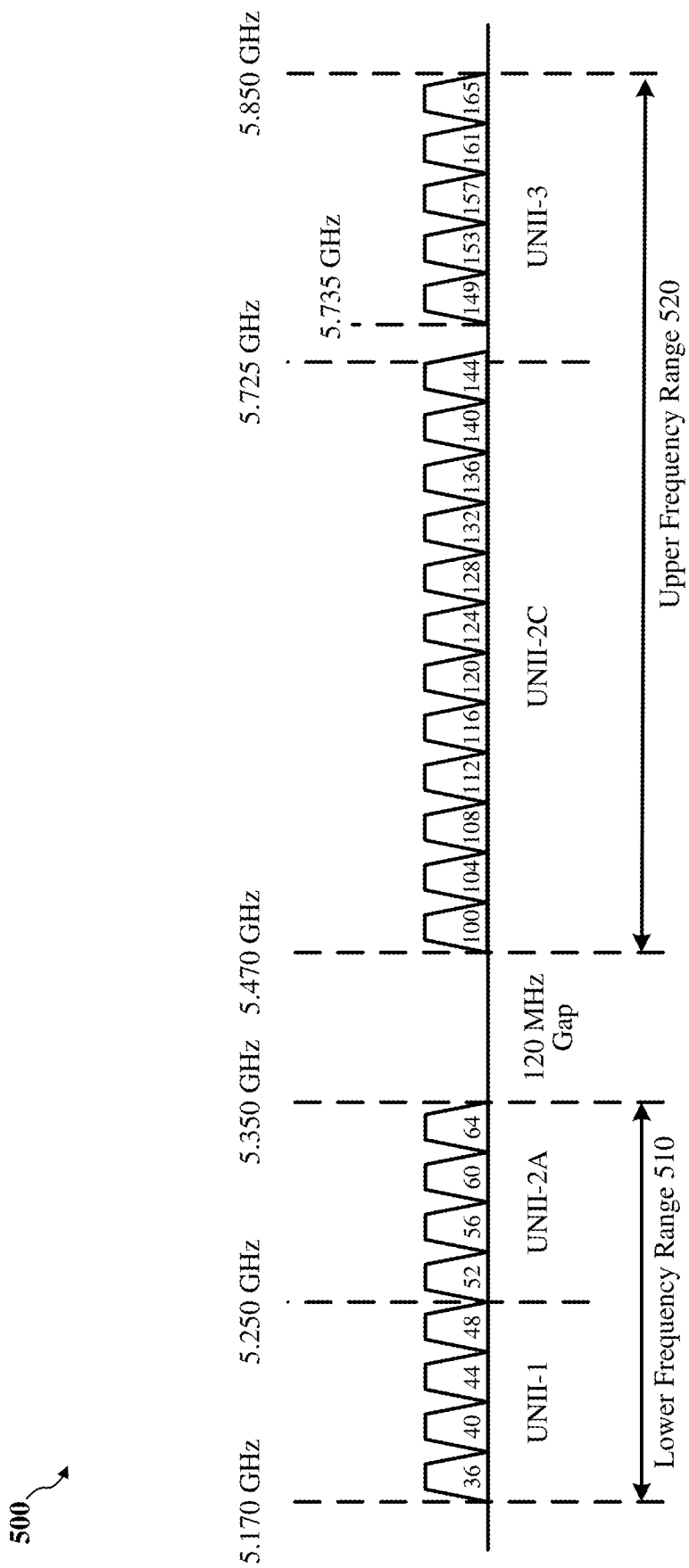
FIG. 5 shows a frequency spectrum of an example 5 GHz frequency band.

FIG. 5 shows a frequency spectrum diagram 500 depicting an example 5 GHz frequency band. The 5 GHz frequency band may range from 5.15 GHz to 5.85 GHz, and may be subdivided into a number of UNIT radio sub-bands. More specifically, the usable sub-bands in the 5 GHz frequency band may include a UNII-1 sub-band (such as between 5.15-5.25 GHz), a UNII-2A sub-band (such as between 5.25-5.35 GHz), a UNII-2C sub-band (such as between 5.470-5.725 GHz), and a UNII-3 sub-band (such as between 5.725-5.850 GHz).

Each of the sub-bands includes a number of 20 MHz channels (such as channels 36-64 and 100-177). The 20 MHz channels may be grouped or paired with one another to form 40 MHz channels. The 40 MHz channels also may be grouped or paired with one another to form 80 MHz channels, and the 80 MHz channels may be further grouped or paired with one another to form a 160 MHz channel. A 120 MHz wide frequency band or gap exists between the UNII-2A sub-band and the UNII-2C sub-band (such as between 5.35-5.47 GHz), dividing the 5 GHz frequency band into a lower frequency range 410 (such as between 5.17-5.35 GHz) and an upper frequency range 520 (such as between 5.47-5.85 GHz). Wireless communications may be restricted in the 120 MHz wide region. The UNII-1 sub-band may allow channel widths of up to 100 MHz, with a maximum transmit power of 50 milliwatts (mW). The UNIT-2A sub-band may allow channel widths of up to 100 MHz, with a maximum transmit power of 250 mW. The UNII-2C sub-band may allow channel widths of up to 255 MHz, with a maximum transmit power of 250 mW. The UNII-3 sub-band may allow channel widths of up to 125 MHz, with an unspecified maximum transmit power.

The European Telecommunications Standards Institute (ETSI) EN 301-893 standards define channel access mechanisms to be used by wireless devices or nodes for transmissions on the UNII-1 and UNII-2 radio bands. For example, the ETSI EN 301-893 standards define a LBT channel access protocol to be used by wireless devices or nodes (including IEEE 802.11-compliant wireless devices and LAA-compliant wireless devices) for gaining channel access on the UNII-1 and UNII-2 radio bands. This channel access mechanism, which may be referred to as a category-2 LBT channel access protocol, includes a mechanism by which wireless devices perform a Clear Channel Assessment (CCA) to ensure that wireless channel is idle before transmitting data on the wireless channel.

The ETSI EN 301-893 standards also define Priority Class dependent channel access parameters that prioritize channel access for high-priority class traffic over low-priority class traffic by using different Contention Window (CW) parameters for different classes of traffic or data. This channel access mechanism, which may be referred to as a category-4 LBT channel access protocol, sets the $CW_{min}$, and $CW_{max}$ parameters at lower values for high-priority class traffic than for low-priority class traffic. For example, wireless devices or nodes associated with class 4 traffic (which is the highest-priority class traffic) use $CW_{min}=3$ and $CW_{max}=7$, wireless devices or nodes associated with class 3 traffic use $CW_{min}=7$ and $CW_{max}=15$, wireless devices or nodes associated with class 2 traffic use $CW_{min}=15$ and $CW_{max}=63$, and wireless devices or nodes associated with class 1 traffic (which is the lowest-priority class traffic) use $CW_{min}=15$ and $CW_{max}=1023$.

In addition to the LBT channel access protocols, the ETSI EN 301-893 standards allow Short Control Signaling Transmissions for FBE devices and LBE devices (such as UEs or gNBs or other wireless nodes). Short Control Signaling Transmissions are typically used by FBE and LBE devices to send management and control frames without sensing the channel for the presence of other signals. The use of Short Control Signaling Transmissions is constrained as follows: within an observation period of 50 ms, the number of Short Control Signaling Transmissions by a given FBE or LBE device shall be less than or equal to 50 ms; and the total duration of the Short Control Signaling Transmissions from a given FBE or LBE device shall be less than 2.5 ms within each observation period. The 2.5 ms time period may be distributed across multiple transmissions or across multiple FBE or LBE devices.

In some implementations, UEs (and other suitable wireless nodes) may transmit positioning signals for Long Term Evolution (LTE) positioning protocols (LPP) operations or RTT-based ranging operations using Short Control Signaling Transmissions (SCST) on one or more UNIT radio bands, for example, to avoid contending for channel access. In some other implementations, UEs (and other suitable wireless nodes) that are to transmit positioning signals for LPP operations or RTT-based ranging operations may use the category-2 LBT channel access mechanism to gain access to one or more unlicensed radio bands, and may transmit the positioning signals on the one or more unlicensed radio bands during a TXOP, for example, to avoid interference associated with multiple devices attempting to transmit data on a shared wireless medium concurrently. In some other implementations, UEs (and other suitable wireless nodes) that are to transmit positioning signals for LPP operations or RTT-based ranging operations may use the category-4 LBT channel access mechanism to gain access to one or more unlicensed radio bands, and may transmit the positioning signals over the one or more unlicensed radio bands during a COT.

Figure 6A:
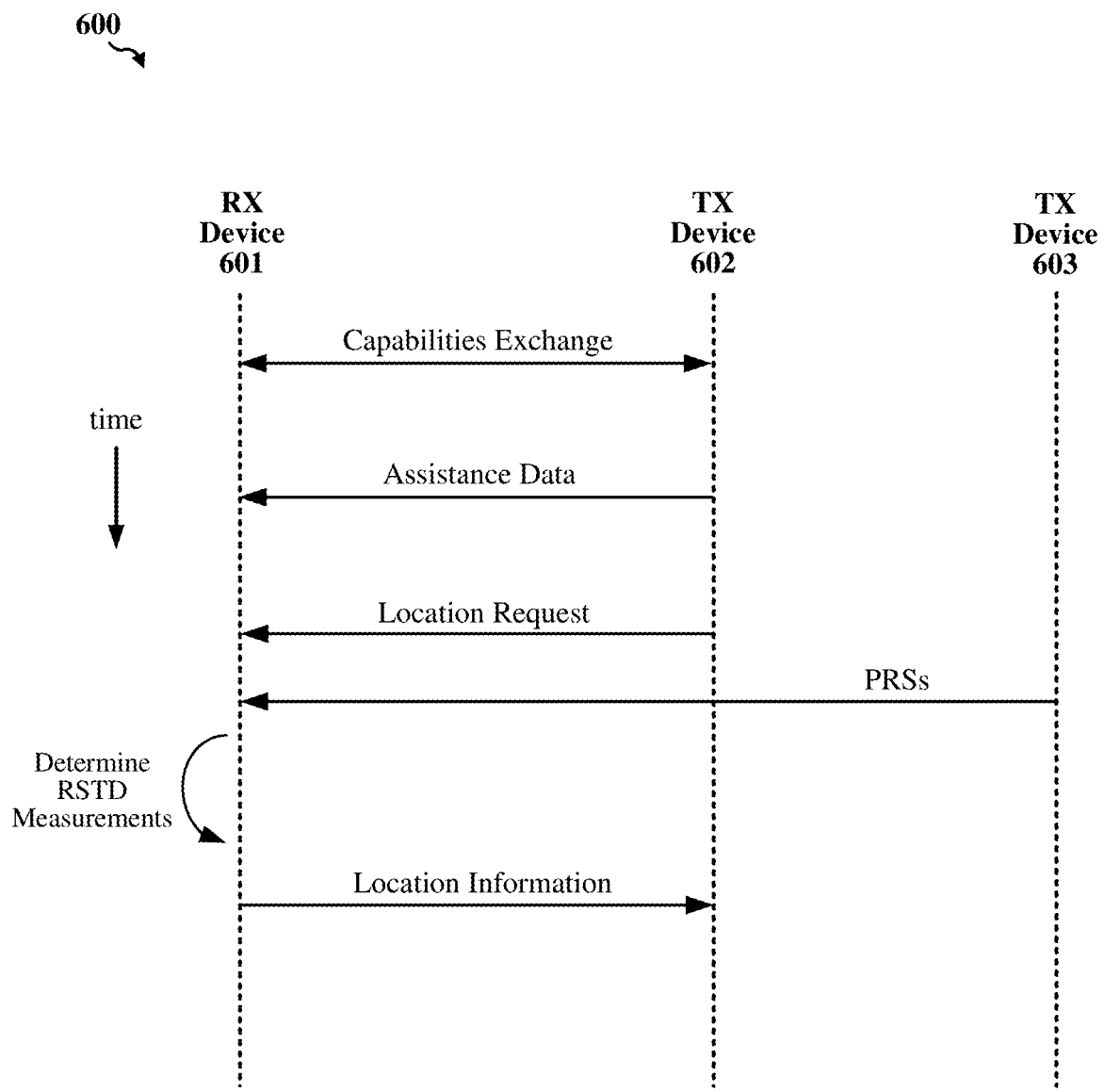
FIG. 6A shows a sequence diagram depicting an example operation for wireless communications that supports positioning operations, according to some implementations.

FIG. 6A shows a sequence diagram depicting an example operation 600 for wireless communications that supports positioning operations, according to some implementations. The operation 600 is described with reference to a receiving device 601, a first transmitting device 602, and a second transmitting device 603. In some instances, the operation 600 may correspond to an OTDOA positioning operation performed using the LTE positioning protocol (LPP). The receiving device 601 may be one example of the base station 102 or the UE 104 of FIG. 1, the base station 310 or the UE 350 of FIG. 3, or another suitable wireless node. In some instances, the first transmitting device 602 may be a location server (such as an E-SMLC). In some other instances, the first transmitting device 602 may be one example of the base station 102, the UE 104, the base station 310, or the UE 350 configured to perform at least some of the functions of the location server. In some instances, the second transmitting device 603 may be one example of the base station 102 or the UE 104 of FIG. 1, or the base station 310 or the UE 350 of FIG. 3. In some other instances, the second transmitting device 603 may be a transmission-reception point (TRP), or another suitable wireless node.

In some implementations, the receiving device 601 can be a first vehicle-UE (v-UE) or a UE carried by a person in the first vehicle, the first transmitting device 602 can be a second v-UE or a UE carried by a person in the second vehicle, and a second transmitting device 603 can be a third v-UE or a UE carried by a person in the third vehicle. The operation 600 may begin with the receiving device 601 and the first transmitting device 602 exchanging capabilities with one another. In some instances, the receiving device 601 may send a message including information such as supported OTDOA modes, supported frequency bands, and support for inter-frequency RSTD measurements. In some other instances, the receiving device 601 and the first transmitting device 602 may not exchange capabilities, or may already have each other's capability information.

The receiving device 601 may receive location assistance data from the first transmitting device 602 over a channel of a radio access network (RAN). In some instances, the channel may be a V2X frequency subband of a 5G NR access network. In some other instances, the channel may be an unlicensed 5G NR radio band. In some other instances, the channel may be a licensed 5G NR radio band. The location assistance data may include a list of candidate transmission-reception points (TRPs) for a positioning operation. For example, the location assistance data may include information for a reference cell and a plurality of neighbor cells (such as the second transmitting device 603). The location assistance data also may include one or more of identification information for the candidate TRPs, timing information for the candidate TRPs, PRS configurations of the candidate TRPs, and location information of the candidate TRPs. Each of the TRPs may be an eNB, a gNB, a UE, or any other suitable wireless device or node.

The receiving device 601 may receive, from the first transmitting device 602, a location measurement request that instructs the receiving device 601 to determine time difference measurements based on positioning reference signals (PRSs) to be transmitted from a number of the candidate TRPs (such as the second transmitting device 603). The location measurement request may include location information type, desired accuracy of the location estimate, and response time. In some instances, the receiving device 601 may receive the location measurement request prior to receiving the location assistance data.

The receiving device 601 may receive a PRS (or a sequence of PRSs) from the second transmitting device 603 (and from one or more of the other candidate TRPs) over an unlicensed radio band, and may determine a number of reference signal time difference (RSTD) measurements based at least in part on the received PRSs. In some instances, the unlicensed radio band may be one or more of the UNIT radio bands. In some other instances, the unlicensed radio band may be an unlicensed 5G NR radio band.

The receiving device 601 may transmit location information to the first transmitting device 602. The location information, which may include the RSTD measurements, is received by the first transmitting device 602 may be used to determine a location of the receiving device 601 relative to the TRPs that transmitted PRSs to the receiving device 601. In some instances, the first transmitting device 602 may use the RSTD measurements and known positions of the transmitting TRPs to determine an absolute position of the receiving device 601. In some other instances, the receiving device 601 may use the RSTD measurements to determine its relative position, or may use trilateration techniques to determine its absolute position based on the RSTD measurements and known locations of the TRPs which transmitted the PRSs.

Figure 6B:
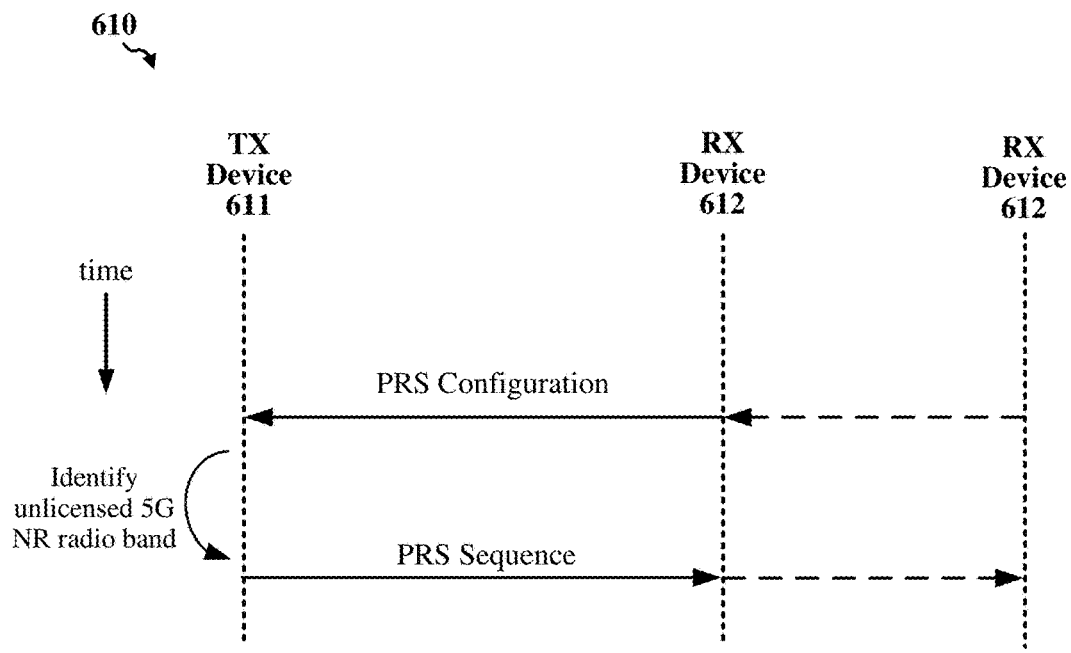
FIG. 6B shows a sequence diagram depicting an example operation for wireless communications that supports positioning operations, according to some other implementations.

FIG. 6B shows a sequence diagram depicting an example operation 610 for wireless communications that supports positioning operations, according to some implementations. The operation 610 is described with reference to a transmitting device 611 and one or more receiving devices 612. The transmitting device 611 may be one example of the base station 102 or UE 104 of FIG. 1, the base station 310 or UE 350 of FIG. 3, or another suitable wireless node. In some instances, the receiving devices 612 may be one example of the base station 102 or the UE 104 of FIG. 1, or the base station 310 or the UE 350 of FIG. 3. In some other instances, the second transmitting device 612 may be a TRP, or another suitable wireless node.

In some implementations, the transmitting device 611 can be a first v-UE or a UE carried by a person in the first vehicle, and the receiving devices 612 can be corresponding second v-UEs or UEs carried by persons in the corresponding second vehicles. The transmitting device 611 may receive a PRS configuration from one of the receiving devices 612 over a channel of a RAN. In some instances, the channel may be a V2X frequency subband of a 5G NR access network. In some other instances, the channel may be the unlicensed 5G NR radio band, or may be a licensed 5G NR radio band. Based on the received PRS configuration, the transmitting device 611 may transmit, to the receiving devices 612, a sequence of PRSs over an unlicensed radio band. In some instances, the unlicensed radio band may be one or more of the UNIT radio bands. In some other instances, the unlicensed radio band may be an unlicensed 5G NR radio band.

In some implementations, the transmitting device 611 may transmit the sequence of PRSs using Short Control Signaling Transmissions, without sensing the wireless channel. In some other implementations, the transmitting device 611 may contend for channel access on the unlicensed radio band using a category-2 LBT channel access mechanism. In some other implementations, the transmitting device 611 may contend for channel access on the unlicensed radio band using a category-4 LBT channel access mechanism.

Figure 6C:
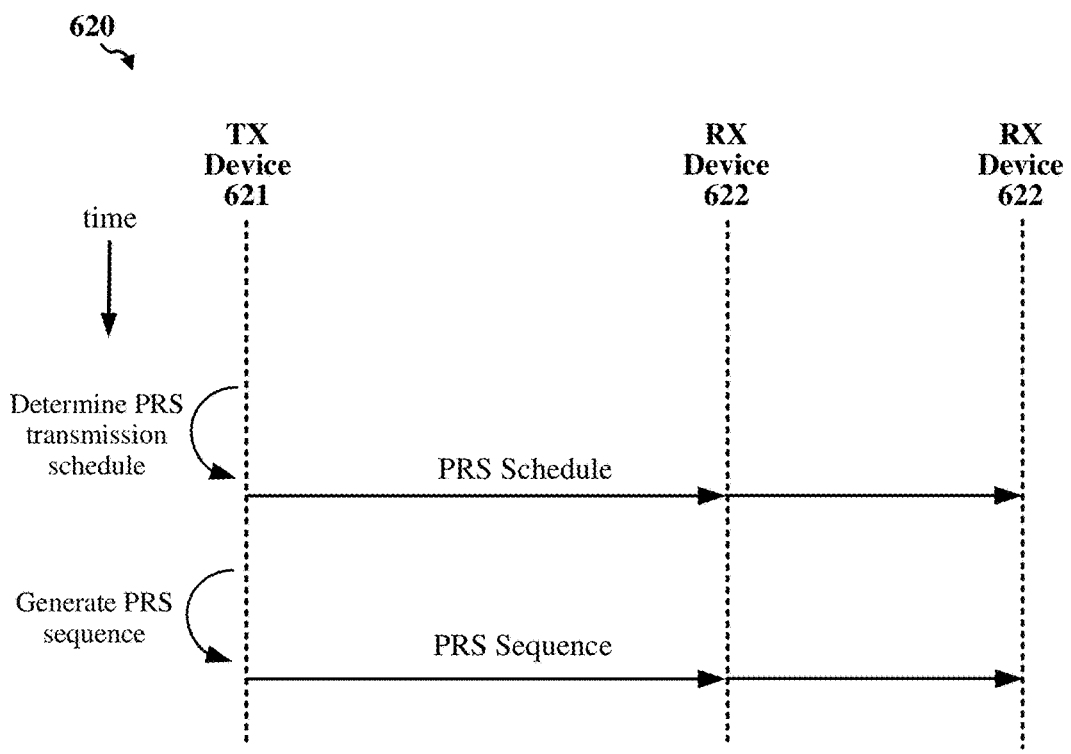
FIG. 6C shows a sequence diagram depicting an example operation for wireless communications that supports positioning operations, according to some other implementations.

FIG. 6C shows a sequence diagram depicting an example operation 620 for wireless communications that supports positioning operations, according to some implementations. The operation 620 is described with reference to a transmitting device 621 and one or more receiving devices 622. The transmitting device 621 may be one example of the base station 102 or the UE 104 of FIG. 1, the base station 310 or the UE 350 of FIG. 3, or another suitable wireless node. In some instances, each of the receiving devices 622 may be one example of the base station 102 or the UE 104 of FIG. 1, or the base station 310 or the UE 350 of FIG. 3. In some other instances, each of the receiving devices 622 may be a TRP or another suitable wireless node.

In some implementations, the transmitting device 621 can be a first v-UE or a UE carried by a person in the first vehicle, and the receiving devices 622 can be corresponding second v-UEs or UEs carried by persons in the corresponding second vehicles. The transmitting device 621 may determine a schedule for transmitting positioning reference signals (PRSs), and may transmit the schedule to the one or more receiving devices 622 over a channel of a RAN. In some instances, the channel may be a V2X frequency subband of a 5G NR access network. In some other instances, the channel may be a physical downlink control channel (PDCCH), a physical downlink shared channel (PDSCH), a physical sidelink control channel (PSCCH), or a physical sidelink shared channel (PSSCH) of the RAN.

The transmitting device 621 may transmit a sequence of PRSs over an unlicensed radio band based on the determined schedule. In some instances, the unlicensed radio band may be one or more of the UNIT radio bands. In some other instances, the unlicensed radio band may be an unlicensed 5G NR radio band. In addition, or in the alternative, the transmitting device 621 may contend for channel access on the unlicensed radio band using a category-4 LBT channel access mechanism.

Figure 6D:
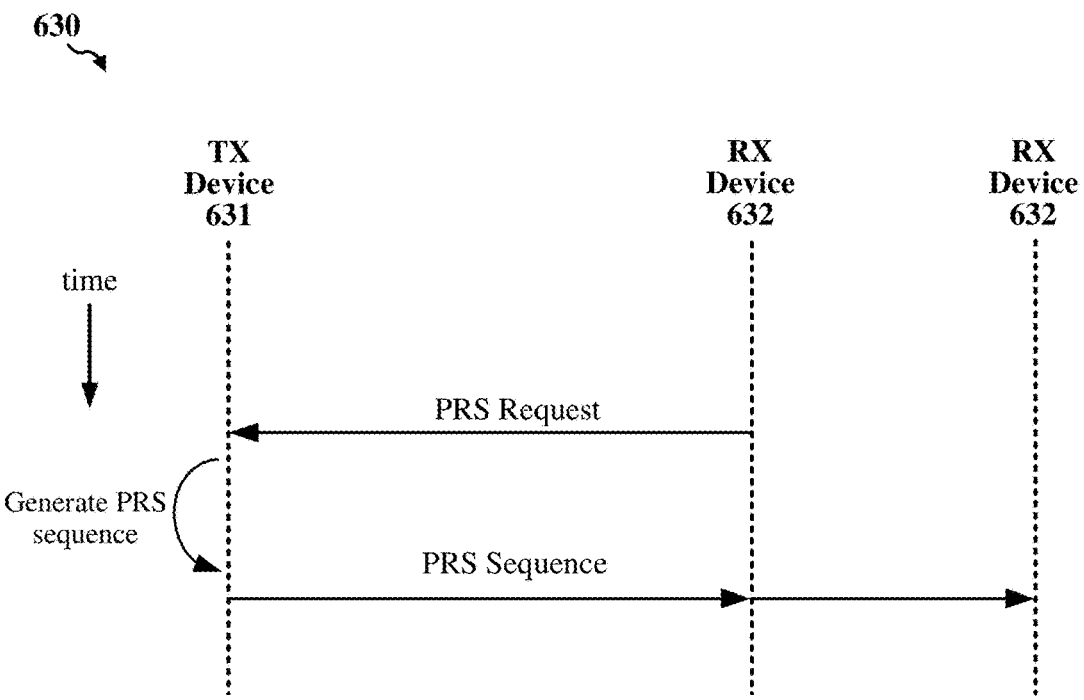
FIG. 6D shows a sequence diagram depicting an example operation for wireless communications that supports positioning operations, according to some other implementations.

FIG. 6D shows a sequence diagram depicting an example operation 630 for wireless communications that supports positioning operations, according to some implementations. The operation 630 is described with reference to a transmitting device 631 and one or more receiving devices 632. The transmitting device 631 may be one example of the base station 102 or the UE 104 of FIG. 1, the base station 310 or the UE 350 of FIG. 3, or another suitable wireless node. In some instances, each of the receiving devices 632 may be one example of the base station 102 or the UE 104 of FIG. 1, or the base station 310 or the UE 350 of FIG. 3. In some instances, each of the receiving devices 632 may be a TRP, or another suitable wireless node.

In some implementations, the transmitting device 631 can be a first v-UE or a UE carried by a person in the first vehicle, and the receiving devices 632 can be corresponding second v-UEs or UEs carried by persons in the corresponding second vehicles. The transmitting device 631 may receive a request to transmit a sequence of positioning reference signals (PRSs) over a channel of a radio access network (RAN). In some instances, the channel may be a V2X frequency subband of a 5G NR access network. In some other instances, the channel may be an unlicensed 5G NR radio band or a licensed 5G NR radio band. Based on the request, the transmitting device 631 may transmit the sequence of PRSs over the unlicensed radio band. In some instances, the unlicensed radio band may be one or more of the UNIT radio bands. In some other instances, the unlicensed radio band may be an unlicensed 5G NR radio band.

In some implementations, the transmitting device 631 may contend for channel access on the unlicensed radio band using a LBT channel access mechanism. In some other implementations, the transmitting device 631 may transmit the sequence of PRSs using Short Control Signaling Transmissions. In some other implementations, the sequence of PRSs may be transmitted during a CET window.

Figure 6E:
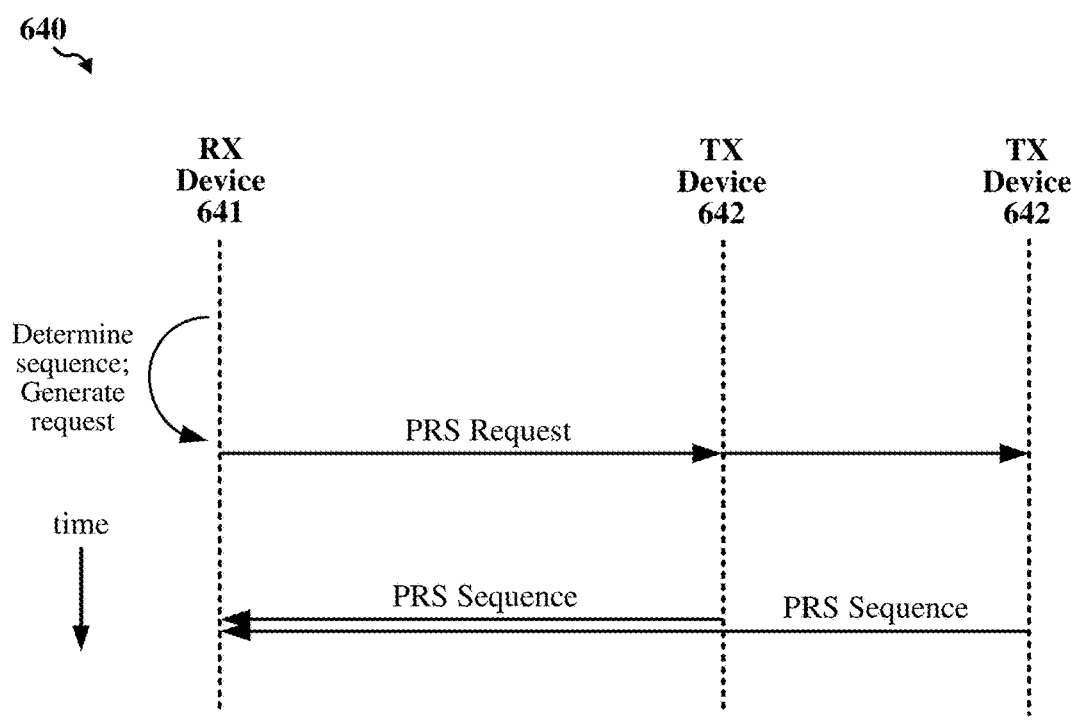
FIG. 6E shows a sequence diagram depicting an example operation for wireless communications that supports positioning operations, according to some other implementations.

FIG. 6E shows a sequence diagram depicting an example operation 640 for wireless communications that supports positioning operations, according to some implementations. The operation 640 is described with reference to a receiving device 641 and one or more transmitting devices 642. The receiving device 641 may be one example of the base station 102 or the UE 104 of FIG. 1, the base station 310 or the UE 350 of FIG. 3, or another suitable wireless node. In some instances, each of the transmitting devices 642 may be one example of the base station 102 or the UE 104 of FIG. 1, or the base station 310 or the UE 350 of FIG. 3. In some other instances, each of the transmitting devices 642 may be a TRP, or another suitable wireless node. In some instances, the channel may be a V2X frequency subband of a 5G NR access network.

In some implementations, the receiving device 641 can be a first v-UE or a UE carried by a person in the first vehicle, and the transmitting devices 642 receiving devices 612 can be corresponding second v-UEs or UEs carried by persons in the corresponding second vehicles. The receiving device 641 may transmit, over a channel of a RAN, a request for the one or more transmitting devices 642 to transmit a sequence of PRSs. The receiving device 641 may receive, from at least one of the transmitting devices 642, the requested sequence of PRSs over an unlicensed radio band. In some instances, the unlicensed radio band may be one or more of the UNIT radio bands. In some other instances, the unlicensed radio band may be an unlicensed 5G NR radio band.

Figure 7:
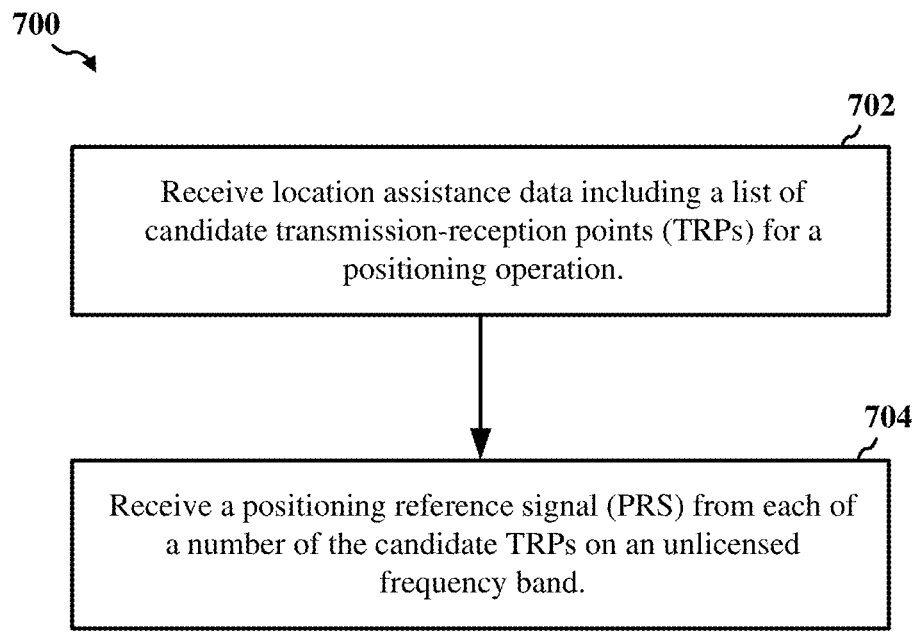
FIG. 7 shows a flowchart depicting an example operation for wireless communications that supports positioning operations, according to some implementations.

FIG. 7 shows a flowchart depicting an example operation for wireless communication that supports positioning operations, according to some implementations. The operation 700 may be performed by an apparatus of a wireless communication device such as the UE 104 of FIG. 1, the UE 350 of FIG. 3, or the receiving device 601 of FIG. 6A. At block 702, the UE receives location assistance data including a list of candidate transmission-reception points (TRPs) for a positioning operation. At block 704, the UE receives a positioning reference signal (PRS) from each of a number of the candidate TRPs over an unlicensed 5G NR radio band.

In some implementations, the location assistance data also may include one or more of identification information for the candidate TRPs, timing information for the candidate TRPs, PRS configurations of the candidate TRPs, or location information of the candidate TRPs. In some other implementations, the location assistance data also may include a transmission time of the PRS from each candidate TRP, and may identify the unlicensed 5G NR radio band upon which each of the PRSs is received. The identification information for a respective candidate TRP may include one or more of a physical cell ID (PID), a global cell ID (GCI), or a UE ID. The PRS configuration may include a bandwidth, a subframe offset, a periodicity, a duration, a muting pattern, and a muting sequence periodicity of the corresponding TRP.

Figure 8A:
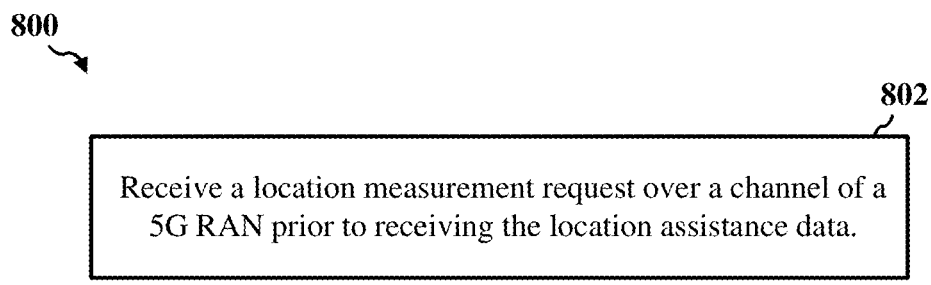
FIG. 8A shows a flowchart depicting an example operation for wireless communications that supports positioning operations, according to some implementations.

FIG. 8A shows a flowchart depicting an example operation 800 for wireless communication that supports positioning operations, according to some implementations. The operation 800 may be performed by an apparatus of a wireless communication device such as the UE 104 of FIG. 1, the UE 350 of FIG. 3, or the receiving device 601 of FIG. 6A. In some implementations, the operation 800 may be performed prior to receiving the location assistance data in block 702 of FIG. 7. For example, at block 802, the UE receives a location measurement request over a channel of a 5G NR access network prior to receiving the location assistance data. In some implementations, the location measurement request may be received from a location server associated with the 5G NR access network. In some instances, the location server may be an Evolved Serving Mobile Location Center (E-SMLC).

In some implementations, the location assistance data may be received on a vehicle-to-everything (V2X) frequency subband of a 5G NR access network. In some other implementations, the location assistance data may be received on another suitable channel of the 5G NR access network, or on a channel of another suitable wireless communication network.

In some implementations, the PRSs may be received on one or more Unlicensed National Information Infrastructure (UNIT) radio bands. In some instances, the one or more UNIT radio bands may include one or more of the UNII-1 radio band, the UNII-2A radio band, the UNII-2B radio band, or the UNII-3 radio band.

Figure 8B:
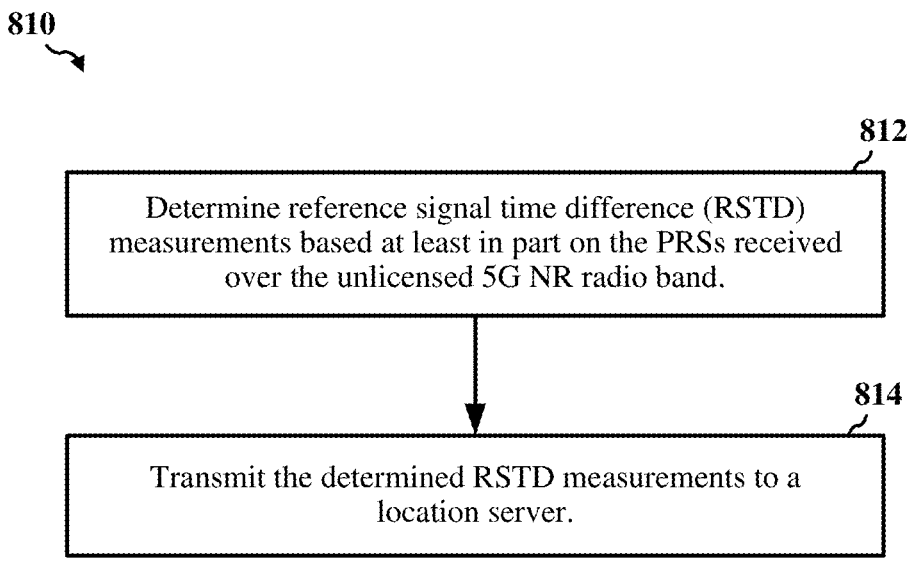
FIG. 8B shows a flowchart depicting an example operation for wireless communications that supports positioning operations, according to some implementations.

FIG. 8B shows a flowchart depicting an example operation 810 for wireless communication that supports positioning operations, according to some implementations. The operation 810 may be performed by an apparatus of a wireless communication device such as the UE 104 of FIG. 1, the UE 350 of FIG. 3, or the receiving device 601 of FIG. 6A. In some implementations, the operation 810 may be performed after receiving the PRSs from the candidate TRPs in block 704 of FIG. 7. At block 812, the UE determines reference signal time difference (RSTD) measurements based at least in part on the PRSs received over the unlicensed 5G NR radio band. At block 814, the UE transmits the determined RSTD measurements to a location server.

In some other implementations, the UE may determine its position based at least in part on the determined RSTD measurements. In some instances, the determined RSTD measurements may be used to determine a number of observed time difference of arrival (OTDOA) values based at least in part on the received PRSs. In some other instances, the OTDOA values may be used to determine a relative position of the UE with respect to the TRPs. In some other instances, the OTDOA values and the known locations of the TRPs may be used to determine an absolute position of the UE using any suitable trilateration technique.

Figure 8C:
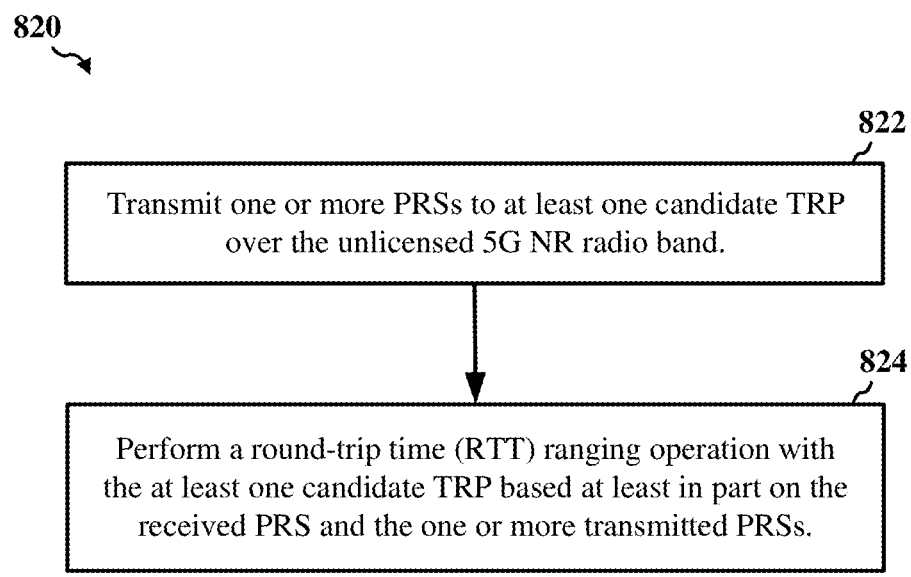
FIG. 8C shows a flowchart depicting an example operation for wireless communications that supports positioning operations, according to some implementations.

FIG. 8C shows a flowchart depicting an example operation 820 for wireless communication that supports positioning operations, according to some implementations. The operation 820 may be performed by an apparatus of a wireless communication device such as the UE 104 of FIG. 1, the UE 350 of FIG. 3, or the receiving device 601 of FIG. 6A. In some implementations, the operation 820 may be performed after receiving the PRSs from the candidate TRPs in block 704 of FIG. 7. For example, at block 822, the UE transmits one or more PRSs to at least one candidate TRP of the number of candidate TRPs over the unlicensed 5G NR radio band. At block 824, the UE performs a round-trip time (RTT) ranging operation with the at least one candidate TRP based at least in part on the received PRS and the one or more transmitted PRSs.

Figure 9:
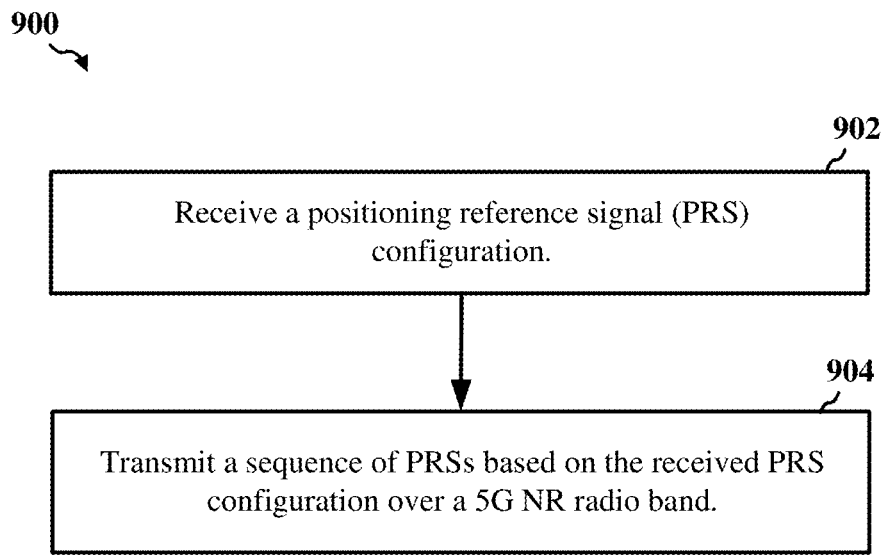
FIG. 9 shows a flowchart depicting an example operation for wireless communications that supports positioning operations, according to some other implementations.

FIG. 9 shows a flowchart depicting an example operation for wireless communication that supports positioning operations, according to other implementations. The operation 900 may be performed by an apparatus of a wireless communication device such as the UE 104 of FIG. 1, the UE 350 of FIG. 3, or the transmitting device 611 of FIG. 6B. At block 902, the UE receives a positioning reference signal (PRS) configuration. At block 904, the UE transmits a sequence of PRSs based on the received PRS configuration over an unlicensed 5G NR radio band.

The PRS configuration may identify the unlicensed 5G NR radio band upon which the UE is to transmit the sequence of PRSs. In some implementations, the PRS configuration may be received on a V2X frequency subband of a 5G NR access network, a licensed radio band of the 5G NR access network, or an unlicensed 5G NR radio band. In some other implementations, the PRS configuration may be received on another suitable channel of the 5G NR access network, or on a channel of another suitable wireless communication network. In some instances, the PRSs may be received on one or more Unlicensed National Information Infrastructure (UNIT) radio bands. The one or more UNIT radio bands may include one or more of the UNII-1 radio band, the UNII-2A radio band, the UNII-2B radio band, or the UNII-3 radio band.

Figure 10A:
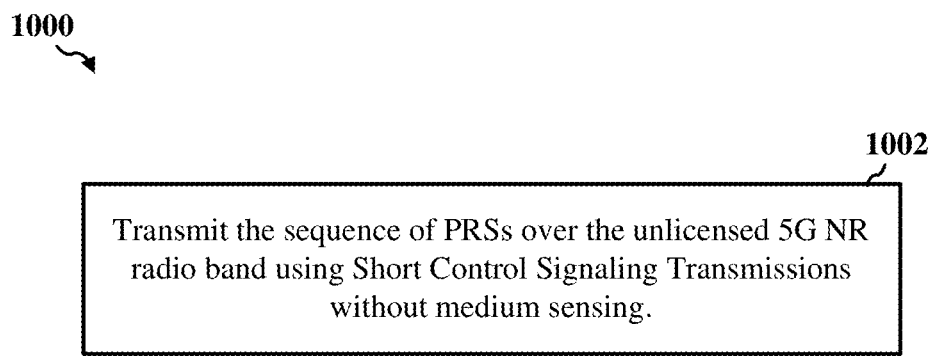
FIG. 10A shows a flowchart depicting an example operation for wireless communications that supports positioning operations, according to some other implementations.

FIG. 10A shows a flowchart depicting an example operation 1000 for wireless communication that supports positioning operations, according to other implementations. The operation 1000 may be performed by an apparatus of a wireless communication device such as the UE 104 of FIG. 1, the UE 350 of FIG. 3, or the transmitting device 611 of FIG. 6B. In some implementations, the operation 1000 may be an example of transmitting the sequence of PRSs in block 904 of FIG. 9. At block 1002, the UE transmits the sequence of PRSs over the unlicensed 5G NR radio band using Short Control Signaling Transmissions without medium sensing. In some implementations, the received PRS configuration allocates a first Clear Channel Assessment (CCA) Exempt Transmission (CET) window for PRS transmissions from the UE within each of number of time periods, and allocates one or more other CET windows for PRS transmissions from one or more wireless nodes within each period. The received PRS configuration also may indicate the CET window allocations.

The time period may correspond to an observation period defined for Short Control Signaling Transmissions on unlicensed radio bands (such as the UNIT radio bands), and each of the CET windows may correspond to a total duration of the Short Control Signaling Transmissions allowed on unlicensed radio bands from a given load-based equipment (LBE) during the observation period. For example, in some instances, the observation period may be approximately 50 milliseconds, and the total duration of the Short Control Signaling Transmissions allowed on the unlicensed radio bands from the given LBE may be approximately 2.5 milliseconds.

Figure 10B:
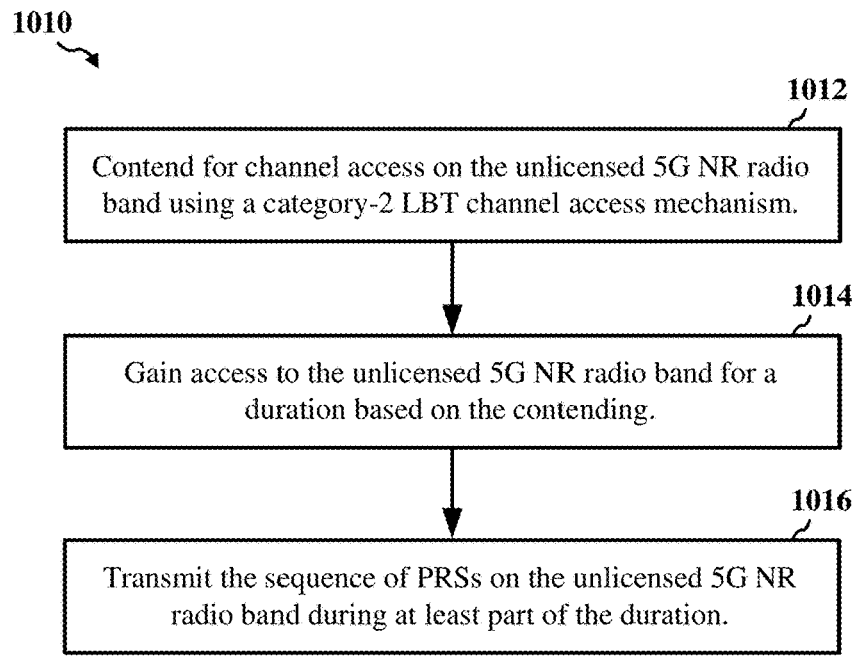
FIG. 10B shows a flowchart depicting an example operation for wireless communications that supports positioning operations, according to some other implementations.

FIG. 10B shows a flowchart depicting an example operation 1010 for wireless communication that supports positioning operations, according to other implementations. The operation 1010 may be performed by an apparatus of a wireless communication device such as the UE 104 of FIG. 1, the UE 350 of FIG. 3, or the transmitting device 611 of FIG. 6B. In some implementations, the operation 1010 may be another example of transmitting the sequence of PRSs in block 904 of FIG. 9. At block 1012, the UE contends for channel access on the unlicensed 5G NR radio band using a category-2 LBT channel access mechanism. At block 1014, the UE gains access to the unlicensed 5G NR radio band for a duration based on the contending. At block 1016, the UE transmits the sequence of PRSs over the unlicensed 5G NR radio band during at least part of the duration.

In some implementations, the received PRS configuration allocates a first PRS window to the UE for PRS transmissions within a time period, and allocates one or more other PRS windows to one or more wireless nodes for PRS transmissions within the time period. The time period may correspond to an observation period defined for Short Control Signaling Transmissions on unlicensed radio bands, and each of the PRS windows may correspond to a total duration of the Short Control Signaling Transmissions allowed on unlicensed radio bands from a given LBE during the observation period. In some instances, the observation period may be approximately 50 milliseconds, and the total duration may be no more than 2.5 milliseconds. In some other instances, the observation period may be of other suitable durations.

Figure 10C:
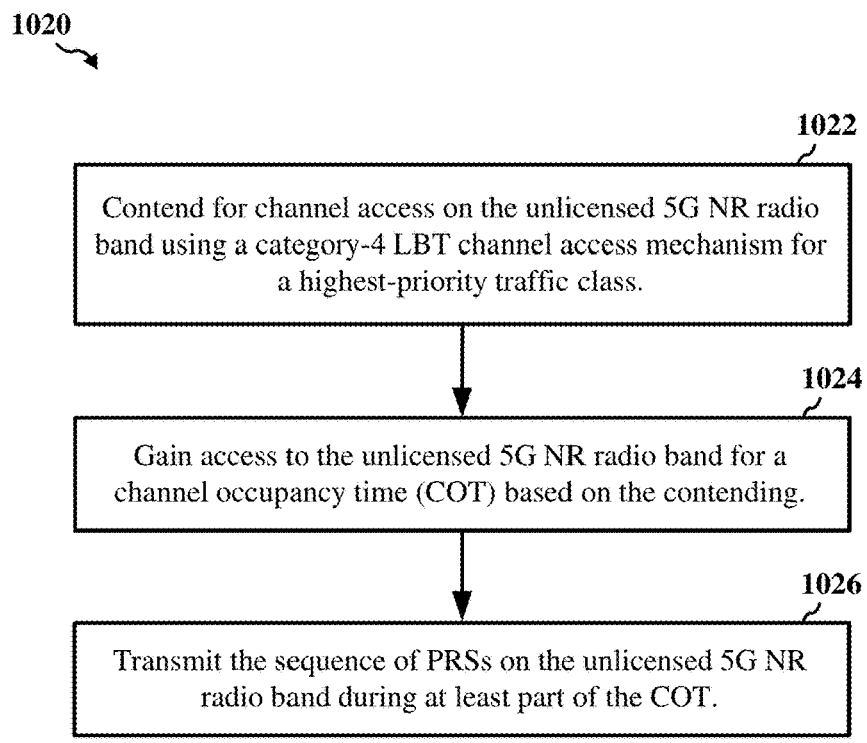
FIG. 10C shows a flowchart depicting an example operation for wireless communications that supports positioning operations, according to some other implementations.

FIG. 10C shows a flowchart depicting an example operation 1020 for wireless communication that supports positioning operations, according to other implementations. The operation 1020 may be performed by a wireless communication device such as the UE 104 of FIG. 1, the UE 350 of FIG. 3, or the transmitting device 611 of FIG. 6B. In some implementations, the PRS configuration may be received on a V2X frequency subband of a 5G NR access network, a licensed radio band of the 5G NR access network, or an unlicensed 5G NR radio band. In some implementations, the operation 1020 may be another example of transmitting the sequence of PRSs in block 904 of FIG. 9. At block 1022, the UE contends for channel access on the unlicensed 5G NR radio band using a category-4 LBT channel access mechanism for a highest-priority traffic class. At block 1024, the UE gains access to the unlicensed 5G NR radio band for a channel occupancy time (COT) based on the contending. At block 1026, the UE transmits the sequence of PRSs over the unlicensed 5G NR radio band during at least part of the COT.

In some implementations, the received PRS configuration may allocate a first PRS window to the UE for PRS transmissions within a time period, and may allocate one or more other PRS windows to one or more wireless nodes for PRS transmissions within the time period. The time period may be independent of the observation period defined for Short Control Signaling Transmissions on unlicensed radio bands (such as the UNIT radio bands), and each of the PRS windows may be independent of a total duration of Short Control Signaling Transmissions allowed on unlicensed radio bands (such as the UNIT radio bands) from a given LBE during the observation period. In some instances, each of the one or more wireless nodes includes one of an nr-gNB, a gNB, an eNB, a UE, an LBE, or a TRP.

Figure 11:
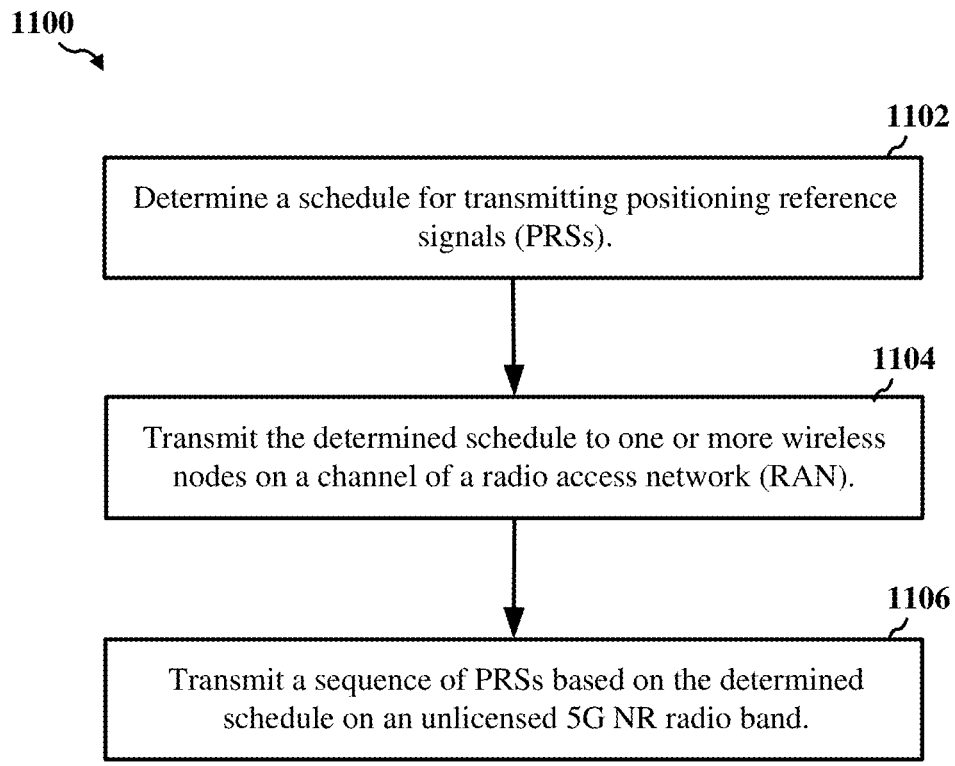
FIG. 11 shows a flowchart depicting an example operation for wireless communications that supports positioning operations, according to some other implementations.

FIG. 11 shows a flowchart depicting an example operation 1100 for wireless communication that supports positioning operations, according to some other implementations. The operation 1100 may be performed by a wireless communication device such as the UE 104 of FIG. 1, the UE 350 of FIG. 3, or the transmitting device 621 of FIG. 6C. At block 1102, the UE determines a schedule for transmitting positioning reference signals (PRSs). At block 1104, UE transmits the determined schedule to one or more wireless nodes over a channel of a radio access network (RAN). At block 1106, the UE transmits a sequence of PRSs based on the determined schedule over an unlicensed radio band (such as the unlicensed 5G NR radio band).

In some instances, the channel may be a V2X frequency subband of a 5G NR access network. In some other instances, the channel may be one of a physical downlink control channel (PDCCH), a physical downlink shared channel (PDSCH), a physical sidelink control channel (PSCCH), or a physical sidelink shared channel (PSSCH) of the RAN. In some instances, the unlicensed radio band may be one or more Unlicensed National Information Infrastructure (UNIT) radio bands. The one or more UNIT radio bands may be one or more of the UNII-1 radio band, the UNII-2A radio band, the UNII-2B radio band, or the UNII-3 radio band.

In some implementations, the determined schedule also may include identification information of the one or more wireless nodes. In some instances, In some instances, each of the one or more wireless nodes may be one of an nr-gNB, a gNB, an eNB, a UE, or a TRP configured to operate in either an LBE mode or an FBE mode.

Figure 12:
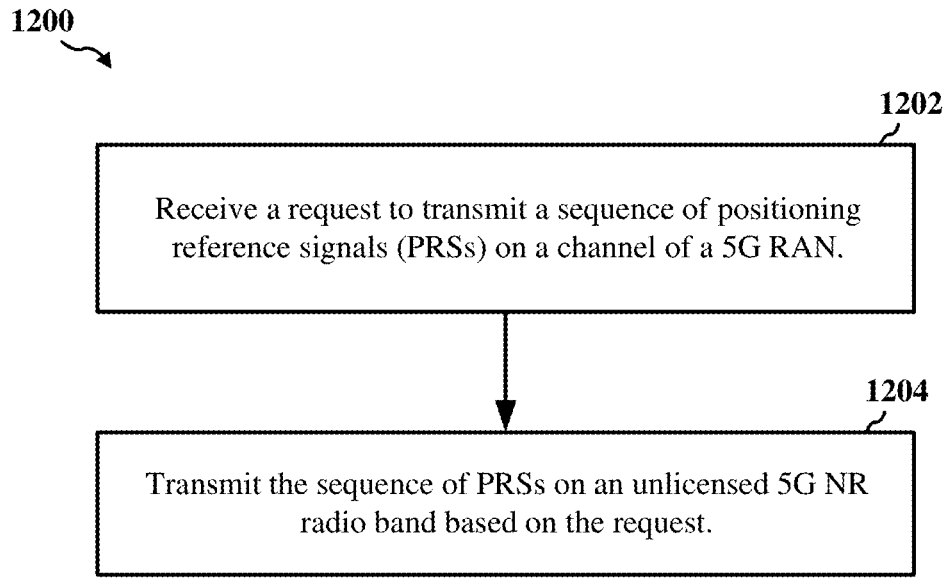
FIG. 12 shows a flowchart depicting an example operation for wireless communications that supports positioning operations, according to some other implementations.

FIG. 12 shows a flowchart depicting an example operation 1200 for wireless communication that supports positioning operations, according to some other implementations. The operation 1200 may be performed by a wireless communication device such as the UE 104 of FIG. 1, the UE 350 of FIG. 3, or the transmitting device 631 of FIG. 6D. At block 1202, the UE receives a request to transmit a sequence of positioning reference signals (PRSs) over a channel of a 5G NR access network. At block 1204, the UE transmits the sequence of PRSs on an unlicensed 5G NR radio band based on the request.

In some implementations, the UE may contend for channel access on the unlicensed 5G NR radio band using a LBT channel access mechanism, and the sequence of PRSs may be transmitted over the unlicensed 5G NR radio band using Short Control Signaling Transmissions. In some instances, the sequence of PRSs may be transmitted over the unlicensed 5G NR radio band during a CET window allocated to the UE. The CET window may correspond to a total duration of the Short Control Signaling Transmissions allowed on unlicensed radio bands from a given LBE during an observation period.

Figure 13:
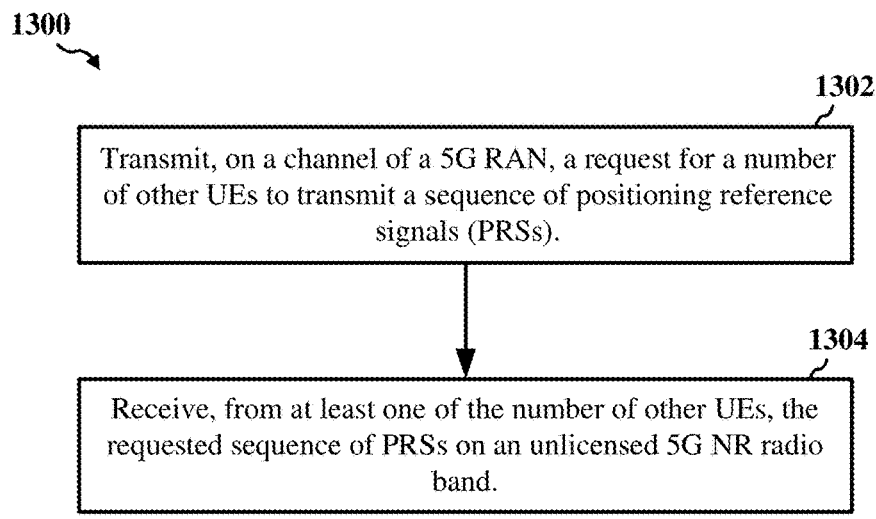
FIG. 13 shows a flowchart depicting an example operation for wireless communications that supports positioning operations, according to some other implementations.

FIG. 13 shows a flowchart depicting an example operation 1300 for wireless communication that supports positioning operations, according to some other implementations. The operation 1300 may be performed by a wireless communication device such as the UE 104 of FIG. 1, the UE 350 of FIG. 3, or the receiving device 641 of FIG. 6E. At block 1302, the UE transmits, over a channel of a 5G NR access network, a request for a number of other UEs to transmit a sequence of positioning reference signals (PRSs). At block 1304, the UE receives, from at least one of the number of other UEs, the requested sequence of PRSs over an unlicensed 5G NR radio band.

In some implementations, the request may be a unicast message identifying each of the number of other UEs for transmitting the sequences of PRSs. In some other implementations, the request may be a multicast message identifying a group of other UEs for transmitting the sequences of PRSs. In some other implementations, the request may identify a group of other UEs that are located within a specified zone.

Figure 14:
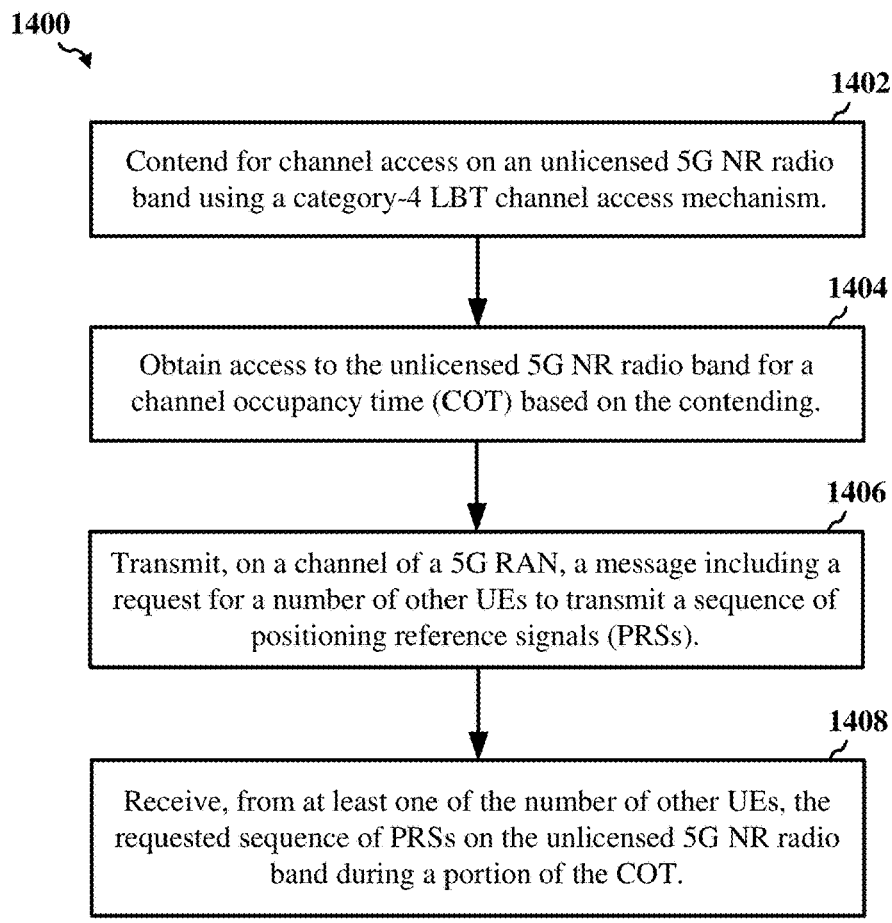
FIG. 14 shows a flowchart depicting an example operation for wireless communications that supports positioning operations, according to some other implementations.

FIG. 14 shows a flowchart depicting an example operation 1400 for wireless communication that supports positioning operations, according to some other implementations. The operation 1400 may be performed by a wireless communication device such as the base station 102 or UE 104 of FIG. 1, the base station 310 or UE 350 of FIG. 3, or any one or more of the transmitting devices or receiving devices of FIGS. 6A-6E. At block 1402, the UE contends for channel access on an unlicensed 5G NR radio band using a category-4 LBT channel access mechanism. At block 1404, the UE obtains access to the unlicensed 5G NR radio band for a channel occupancy time (COT) based on the contending. At block 1406, the UE transmits, over a channel of a 5G NR access network, a message including a request for a number of other UEs to transmit a sequence of positioning reference signals (PRSs). At block 1408, the UE receives, from at least one of the number of other UEs, the requested sequence of PRSs over the unlicensed 5G NR radio band during a portion of the COT.

Figure 15:
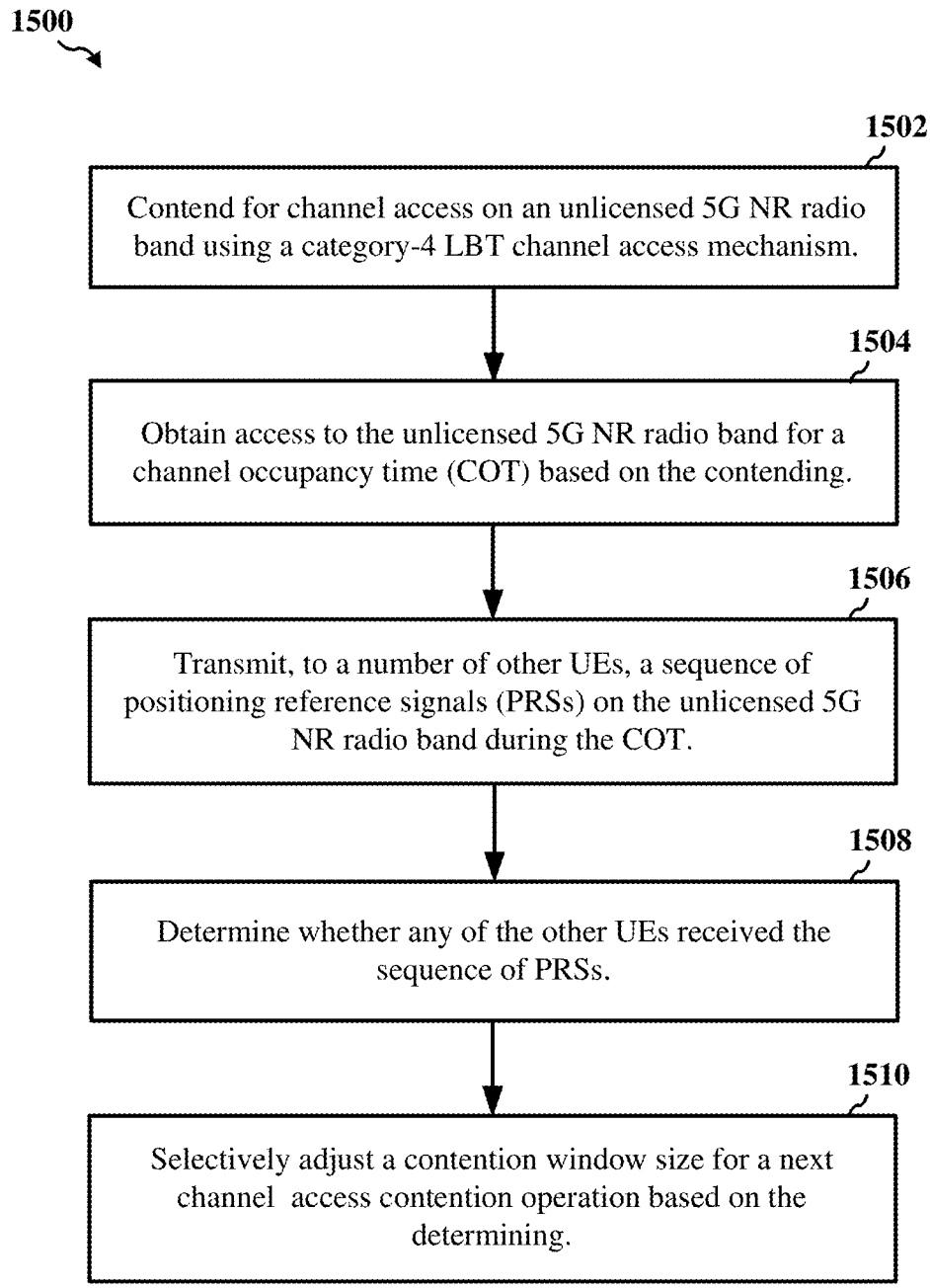
FIG. 15 shows a flowchart depicting an example operation for wireless communications that supports positioning operations, according to some other implementations.

FIG. 15 shows a flowchart depicting an example operation 1500 for wireless communication that supports positioning operations, according to some other implementations. The operation 1500 may be performed by a wireless communication device such as the base station 102 or UE 104 of FIG. 1, the base station 310 or UE 350 of FIG. 3, or any one or more of the transmitting devices or receiving devices of FIGS. 6A-6E. At block 1502, the UE contends for channel access on an unlicensed 5G NR radio band using a category-4 LBT channel access mechanism. At block 1504, the UE obtains access to the unlicensed 5G NR radio band for a channel occupancy time (COT) based on the contending. At block 1506, the UE transmits, to a number of other UEs, a sequence of positioning reference signals (PRSs) over the unlicensed 5G NR radio band during the COT. At block 1508, the UE determines whether any of the number of other UEs received the sequence of PRSs. At block 1510, the UE selectively adjusts a contention window size for a next channel access procedure based on the determining.

In some implementations, the category-4 LBT channel access mechanism may be (or may be based on) an Enhanced Clear Channel Access (ECCA) mechanism without exponential back-off, and the COT may be based on regulations associated with one or more unlicensed radio bands. The sequence of PRSs, which may be used by one or more of the other UEs for positioning operations (such as OTDOA positioning), may be transmitted on one or more unlicensed radio bands such as (but not limited to) the Unlicensed National Information Infrastructure (UNIT) radio bands. In some instances, the one or more UNIT radio bands may be one or more of the UNII-1 radio band, the UNII-2A radio band, the UNII-2B radio band, or the UNII-3 radio band.

Figure 16:
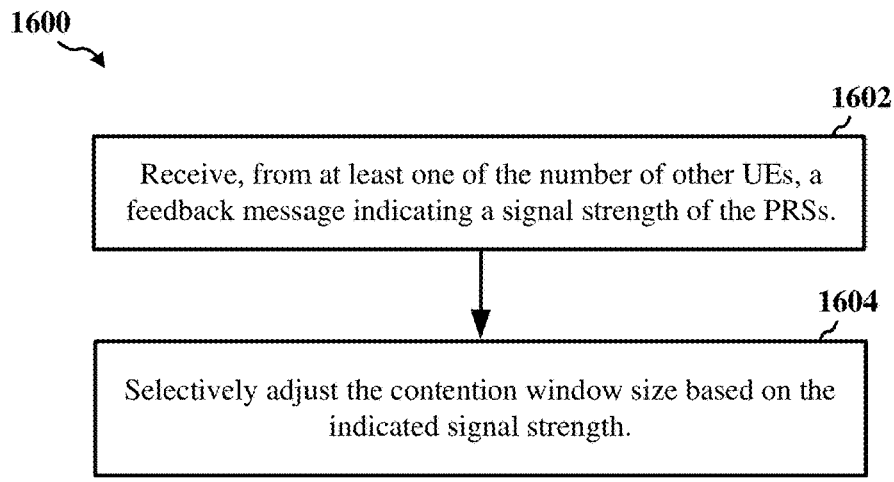
FIG. 16 shows a flowchart depicting an example operation for wireless communications that supports positioning operations, according to some other implementations.

FIG. 16 shows a flowchart depicting an example operation 1600 for wireless communication that supports positioning operations, according to some other implementations. The operation 1600 may be performed by a wireless communication device such as the UE 104 of FIG. 1, the UE 350 of FIG. 3, or any one or more of the transmitting devices 611, 621, or 631 of FIG. 6A, 6B, or 6C, respectively. In some implementations, the operation 1600 may be an example of determining whether any of the number of other UEs received the sequence of PRSs in block 1508 of FIG. 15.

At block 1602, the UE receives, from at least one of the number of other UEs, a feedback message indicating a signal strength of the PRSs. At block 1604, the UE selectively adjusts the contention window size based on the indicated signal strength. In some instances, one or more of the feedback messages may be received on a V2X frequency subband of a 5G NR access network, and may include RSSI values of the PRSs received by a corresponding one of the other UEs. In some other instances, the feedback messages may be received on another suitable channel of the RAN. In some other implementations, the feedback messages may be received on one or more unlicensed radio bands.

Figure 17:
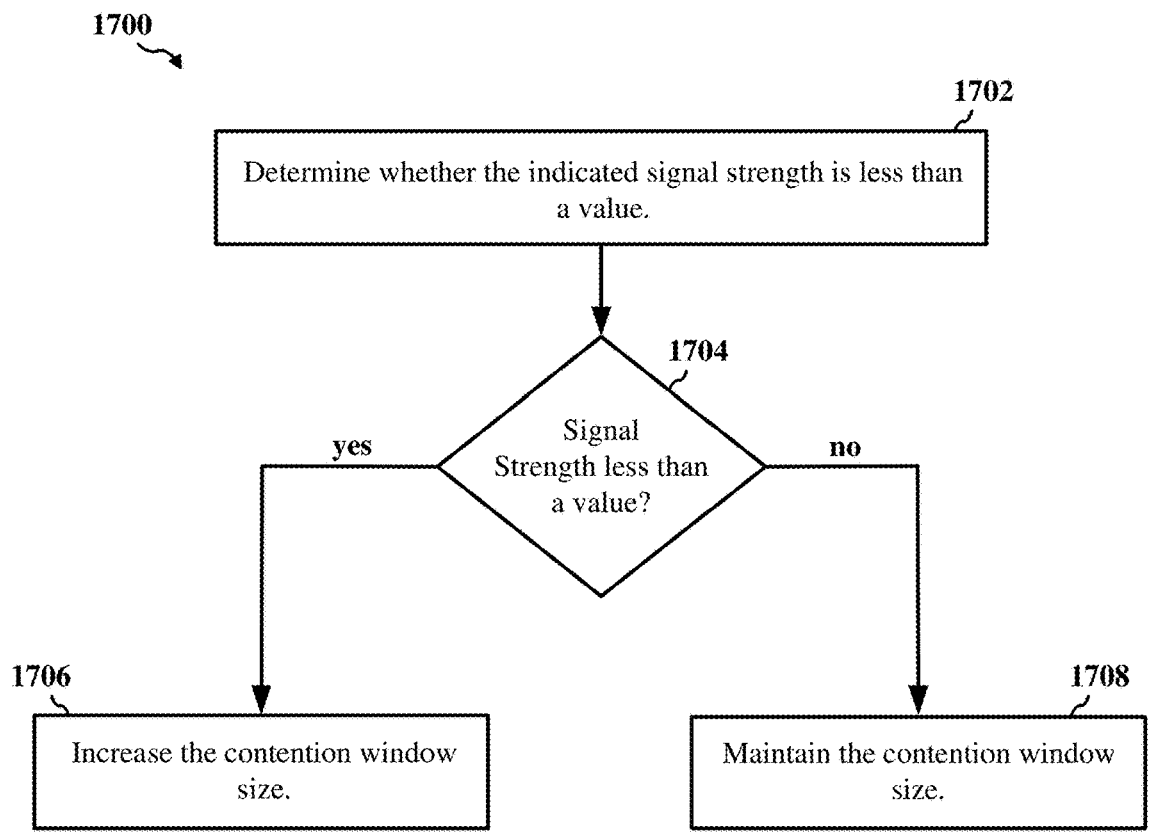
FIG. 17 shows a flowchart depicting an example operation for wireless communications that supports positioning operations, according to some other implementations.

FIG. 17 shows a flowchart depicting an example operation 1700 for wireless communication that supports positioning operations, according to some other implementations. The operation 1700 may be performed by a wireless communication device such as the UE 104 of FIG. 1, the UE 350 of FIG. 3, or any one or more of the transmitting devices 611, 621, or 631 of FIG. 6B, 6C, or 6D, respectively. In some implementations, the operation 1700 may be an example of selectively adjusting the contention window size in block 1604 of FIG. 16. At block 1702, the UE determines whether the indicated signal strength is less than a value. If the indicated signal strength is less than the value, as determined at block 1704, then at block 1706, the UE increases the contention window size. If the indicated signal strength is not less than the value, as determined at block 1704, then at block 1708, the UE maintains the contention window size. In some instances, the value may correspond to a minimum RSSI value for a positioning signal to achieve a specified accuracy.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs (such as one or more modules of computer program instructions), encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method performed by an apparatus of a user equipment (UE), comprising:
   receiving location assistance data including a list of candidate transmission-reception points (TRPs) for a positioning operation;
   receiving a positioning reference signal (PRS) from each candidate TRP of a quantity of the candidate TRPs over an unlicensed Fifth Generation (5G) New Radio (NR) radio band;
   transmitting one or more PRSs to at least one candidate TRP of the quantity of candidate TRPs over the unlicensed 5G NR radio band; and
   performing a round-trip time (RTT) ranging operation with the at least one candidate TRP based at least in part on the received PRSs and the one or more transmitted PRSs.

2. The method of claim 1, further comprising:
   prior to receiving the location assistance data, receiving a location measurement request over a channel of a 5G NR access network.

3. The method of claim 2, wherein the channel comprises a vehicle-to everything (V2X) frequency subband of the 5G NR access network, the unlicensed 5G NR radio band, or a licensed 5G NR radio band.

4. The method of claim 2, wherein the channel comprises one or more Unlicensed National Information Infrastructure (UNII) radio bands.

5. The method of claim 1, further comprising:
   determining reference signal time difference (RSTD) measurements based at least in part on the PRSs received over the unlicensed 5G NR radio band; and
   transmitting the determined RSTD measurements to a location server.

6. The method of claim 1, wherein the location assistance data includes a PRS configuration indicating one or more of a transmission time of the PRS from each candidate TRP of the quantity of candidate TRPs or the unlicensed 5G NR radio band upon which each of the PRSs is received.

7. A wireless communication device, comprising:
   a memory;
   at least one network interface; and
   a processing system communicatively coupled to the memory and the at least one network interface, wherein the processing system is configured to:
   receive location assistance data including a list of candidate transmission-reception points (TRPs) for a positioning operation;
   receive a positioning reference signal (PRS) from each candidate TRP of a quantity of the candidate TRPs over an unlicensed Fifth Generation (5G) New Radio (NR) band;
   transmit one or more PRSs to at least one candidate TRP of the quantity of candidate TRPs over the unlicensed 5G NR radio band; and
   perform a round-trip time (RTT) ranging operation with the at least one candidate TRP based at least in part on the received PRSs and the one or more transmitted PRSs.

8. The wireless communication device of claim 7, wherein the processing system is further configured to:
   prior to receiving the location assistance data, receive a location measurement request over a channel of a 5G NR access network.

9. The wireless communication device of claim 7, wherein the processing system is further configured to:
   determine reference signal time difference (RSTD) measurements based at least in part on the PRSs received over the unlicensed 5G NR radio band; and
   transmit the determined RSTD measurements to a location server.

10. A method performed by an apparatus of a user equipment (UE), comprising:
    receiving a positioning reference signal (PRS) configuration identifying an unlicensed Fifth Generation (5G) New Radio (NR) radio band upon which the UE is to transmit a sequence of PRSs;
    transmitting the sequence of PRSs based on the received PRS configuration over the unlicensed 5G NR radio band;
    receiving one or more additional PRSs over the unlicensed 5G NR radio band; and
    performing a round-trip time (RTT) ranging operation based at least in part on the received one or more additional PRSs and the transmitted sequence of PRSs.

11. The method of claim 10, wherein the PRS configuration is received over a channel comprising one of a vehicle-to everything (V2X) frequency subband of a 5G NR access network, a licensed radio band of the 5G NR access network, or an unlicensed 5G NR radio band.

12. The method of claim 10, wherein the sequence of PRSs is transmitted over the unlicensed 5G NR radio band using Short Control Signaling Transmissions without medium sensing.

13. The method of claim 12, wherein the received PRS configuration allocates a first Clear Channel Assessment (CCA) Exempt Transmission (CET) window for PRS transmissions from the UE within a time period, and allocates one or more other CET windows for PRS transmissions from one or more wireless nodes within the time period.

14. The method of claim 13, wherein the time period corresponds to an observation period defined for Short Control Signaling Transmissions over unlicensed radio bands, and each CET window corresponds to a total duration of the Short Control Signaling Transmissions allowed over unlicensed radio bands from a given load-based equipment (LBE) during the observation period.

15. The method of claim 10, wherein transmitting the sequence of PRSs comprises:
contending for channel access on the unlicensed 5G NR radio band using a category-2 listen-before-talk (LBT) channel access mechanism;
gaining access to the unlicensed 5G NR radio band for a duration based on the contending; and
transmitting the sequence of PRSs over the unlicensed 5G NR radio band during at least part of the duration.

16. The method of claim 15, wherein the received PRS configuration allocates a first PRS window to the UE for PRS transmissions within a time period, and allocates one or more other PRS windows to one or more wireless nodes for PRS transmissions within the time period.

17. The method of claim 16, wherein the time period corresponds to an observation period defined for Short Control Signaling Transmissions over unlicensed radio bands, and each PRS window corresponds to a total duration of the Short Control Signaling Transmissions allowed on unlicensed radio bands from a given load-based equipment (LBE) during the observation period.

18. The method of claim 10, wherein transmitting the sequence of PRSs comprises:
contending for channel access on the unlicensed 5G NR radio band using a category-4 listen-before-talk (LBT) channel access mechanism for a highest-priority traffic class;
gaining access to the unlicensed 5G NR radio band for a channel occupancy time (COT) based on the contending; and
transmitting the sequence of PRSs over the unlicensed 5G NR radio band during at least part of the COT.

19. The method of claim 18, wherein the received PRS configuration allocates a first PRS window to the UE for PRS transmissions within a time period, and allocates one or more other PRS windows to one or more wireless nodes for PRS transmissions within the time period.

20. A wireless communication device, comprising:
a memory;
at least one network interface; and
a processing system communicatively coupled to the memory and the at least one network interface, wherein the processing system is configured to:
receive a positioning reference signal (PRS) configuration identifying an unlicensed Fifth Generation (5G) New Radio (NR) radio band upon which the wireless communication device is to transmit a sequence of PRSs;
transmit the sequence of PRSs based on the received PRS configuration over the unlicensed 5G NR radio band;
receive one or more additional PRSs over the unlicensed 5G NR radio band; and
perform a round-trip time (RTT) ranging operation based at least in part on the received one or more additional PRSs and the transmitted sequence of PRSs.

21. The wireless communication device of claim 20, wherein the processing system is further configured to transmit the sequence of PRSs over the unlicensed 5G NR radio band using Short Control Signaling Transmissions without medium sensing.

22. The wireless communication device of claim 21, wherein the received PRS configuration allocates a first Clear Channel Assessment (CCA) Exempt Transmission (CET) window for PRS transmissions from the wireless communication device within each of number of time periods, and allocates one or more other CET windows for PRS transmissions from one or more wireless nodes within each time period of the number of time periods.

23. The wireless communication device of claim 20, wherein the processing system is configured to transmit the sequence of PRSs by:
contending for channel access on the unlicensed 5G NR radio band using a category-2 listen-before-talk (LBT) channel access mechanism;
gaining access to the unlicensed 5G NR radio band for a duration based on the contending; and
transmitting the sequence of PRSs over the unlicensed 5G NR radio band during at least part of the duration.

24. The wireless communication device of claim 23, wherein the received PRS configuration allocates a first PRS window to the wireless communication device for PRS transmissions within a time period, and allocates one or more other PRS windows to one or more wireless nodes for PRS transmissions within the time period.

25. The wireless communication device of claim 24, wherein the time period corresponds to an observation period defined for Short Control Signaling Transmissions on unlicensed radio bands, and each of the PRS windows corresponds to a total duration of the Short Control Signaling Transmissions allowed on unlicensed radio bands from a given load-based equipment (LBE) during the observation period.

26. The wireless communication device of claim 20, wherein the processing system is configured to transmit the sequence of PRSs by:
contending for channel access on the unlicensed 5G NR radio band using a category-4 listen-before-talk (LBT) channel access mechanism for a highest-priority traffic class;
gaining access to the unlicensed 5G NR radio band for a channel occupancy time (COT) based on the contending; and
transmitting the sequence of PRSs over the unlicensed 5G NR radio band during at least part of the COT.

* * * * *